US012375726B1

(12) United States Patent
Choi et al.

(10) Patent No.: US 12,375,726 B1
(45) Date of Patent: Jul. 29, 2025

(54) COMPUTER-IMPLEMENTED METHOD AND APPARATUS FOR VIDEO CODING USING AN IMPLICIT VIDEO FRAME OUTPUT PROCESS

(71) Applicant: Amazon Technologies, Inc., Seattle, WA (US)

(72) Inventors: Byeongdoo Choi, Irvine, CA (US); Christopher Andrew Segall, Camas, WA (US); Kiran Mukesh Misra, Camas, WA (US)

(73) Assignee: Amazon Technologies, Inc., Seattle, WA (US)

( * ) Notice: Subject to any disclaimer, the term of this patent is extended or adjusted under 35 U.S.C. 154(b) by 13 days.

(21) Appl. No.: 18/342,406

(22) Filed: Jun. 27, 2023

(51) Int. Cl.
*H04N 19/00* (2014.01)
*H04N 19/172* (2014.01)
*H04N 19/184* (2014.01)
*H04N 19/70* (2014.01)

(52) U.S. Cl.
CPC .......... *H04N 19/70* (2014.11); *H04N 19/172* (2014.11); *H04N 19/184* (2014.11)

(58) Field of Classification Search
CPC ..... H04N 19/70; H04N 19/172; H04N 19/184
See application file for complete search history.

(56) References Cited

U.S. PATENT DOCUMENTS

| 8,989,508 | B2 * | 3/2015 | Deshpande | H04N 19/44 |
| | | | | 708/203 |
| 9,049,427 | B2 * | 6/2015 | Hattori | G11B 20/1252 |
| 9,319,703 | B2 * | 4/2016 | Wang | H04N 19/463 |
| 9,969,299 | B2 * | 5/2018 | Murase | B60L 5/42 |
| 10,313,698 | B2 * | 6/2019 | Sullivan | H04N 19/70 |
| 10,623,753 | B2 * | 4/2020 | Skupin | H04N 23/698 |
| 11,700,390 | B2 * | 7/2023 | Wang | H04N 19/174 |
| | | | | 375/240.02 |
| 11,743,505 | B2 * | 8/2023 | Wang | H04N 19/172 |
| | | | | 375/240.02 |
| 11,765,394 | B2 * | 9/2023 | Wang | H04L 65/80 |
| | | | | 375/240.25 |
| 11,812,062 | B2 * | 11/2023 | Wang | H04N 19/172 |
| 12,022,122 | B2 * | 6/2024 | Deshpande | H04N 19/423 |

(Continued)

OTHER PUBLICATIONS

U.S. Appl. No. 18/186,084, Pending.

(Continued)

*Primary Examiner* — Frank F Huang
(74) *Attorney, Agent, or Firm* — NICHOLSON DE VOS WEBSTER & ELLIOTT LLP

(57) ABSTRACT

The present disclosure relates to methods, apparatus, systems, and non-transitory computer-readable storage media for video coding using an implicit video frame output process. According to some examples, a computer-implemented method includes receiving a video at a content delivery service; encoding, by the content delivery service, the video into an encoded video; generating, by the content delivery service, at least one open bitstream unit from the encoded video according to a video coding format that does not utilize a show existing frame syntax element set to one to indicate a frame in a reference picture buffer of a decoder is to be displayed; and transmitting the at least one open bitstream unit from the content delivery service to the decoder.

20 Claims, 17 Drawing Sheets

(56) References Cited

U.S. PATENT DOCUMENTS

| | | | |
|---|---|---|---|
| 12,034,927 B2* | 7/2024 | Okawa | H04N 19/70 |
| 2006/0126952 A1 | 6/2006 | Suzuki et al. | |
| 2010/0220939 A1 | 9/2010 | Tourapis et al. | |
| 2014/0086336 A1* | 3/2014 | Wang | H04N 19/31 |
| | | | 375/240.26 |
| 2019/0068969 A1 | 2/2019 | Rusanovskyy et al. | |
| 2020/0374524 A1 | 11/2020 | Gao et al. | |
| 2022/0321919 A1 | 10/2022 | Deshpande | |
| 2024/0137577 A1 | 4/2024 | Lin et al. | |
| 2024/0205439 A1* | 6/2024 | Sjöberg et al. | H04N 19/70 |
| 2024/0214558 A1 | 6/2024 | Dumas et al. | |
| 2024/0236366 A1* | 7/2024 | Choi | H04N 19/176 |
| 2024/0267548 A1 | 8/2024 | Du et al. | |
| 2024/0292003 A1* | 8/2024 | Damghanian | H04N 19/188 |

OTHER PUBLICATIONS

U.S. Appl. No. 18/186,006, Pending.

U.S. Appl. No. 18/752,554, Pending.

De Rivaz, P., et al., "AV1 Bitstream & Decoding Process Specification", Version 1.0.0 with Errata 1, Jan. 8, 2019, available online at https://aomediacodec.github.io/av1-spec/av1-spec.pdf, 681 pages.

The Linux Foundation, "CONV2D", PyTorch open source code, Dec. 2022, retrieved from https://pytorch.org/docs/stable/generated/torch.nn.Conv2d.html, 2 pages.

Non-Final Office Action, U.S. Appl. No. 18/186,006, Oct. 25, 2024, 12 pages.

Non-Final Office Action, U.S. Appl. No. 18/186,084, Aug. 14, 2024, 20 pages.

Ding, Dandan et al., "Advances In Video Compression System Using Deep Neural Network: A Review And Case Studies", arXiv:2101.06341v1, Jan. 16, 2021, 27 pages.

International Search Report and Written Opinion, PCT App. No. PCT/US2024/010748, May 3, 2024, 09 pages.

Kang, Jihong et al., "Multi-modal/multi-scale Convolutional Neural Network Based In-loop Filter Design for Next Generation Video Codec", IEEE International Conference on Image Processing (ICIP), Sep. 2017, pp. 26-30.

Wang, Zhao et al., "AHG11: Separate Density Attention Network for Loop Filtering", Joint Video Experts Team (JVET) of ITU-T SG 16 WP 3 and ISO/IEC JTC 1/SC 29, 22nd Meeting, Apr. 2021, 3 pages.

Zhao, Yanchen et al., "Joint Luma and Chroma Multi-Scale CNN In-loop Filter for Versatile Video Coding", IEEE International Symposium on Circuits and Systems (ISCAS), May 2022, pp. 3205-3209.

Final Office Action, U.S. Appl. No. 18/186,084, Mar. 7, 2025, 25 pages.

Kang, Jihong et al., "Multi-modal/Multi-scale Convolutional Neural Network Based In-loop Filter Design for Next Generation Video Codec", IEEE International Conference on Image Processing, Sep. 2017, 5 pages.

Notice of Allowance, U.S. Appl. No. 18/186,006, Apr. 7, 2025, 7 pages.

Wang, Zhao et al., "AHG11: Separate Density Attention Network for Loop Filtering", 22nd Meeting of the Joint Video Experts Team (JVET), Document No. JVET-V0074-v3, Apr. 2021, 3 pages.

Wang, Zhao et al., "Multi-Density Attention Network for Loop Filtering in Video Compression", arXiv:2104.12865v1, Apr. 8, 2021, 9 pages.

* cited by examiner

OPEN BITSTREAM UNIT (OBU) TYPE HEADER SEMANTICS 200

| obu_type | Name of obu_type |
|---|---|
| 0 | Reserved |
| 1 | OBU_SEQUENCE_HEADER |
| 2 | OBU_TEMPORAL_DELIMITER |
| 3 | OBU_FRAME_HEADER 202 |
| 4 | OBU_TILE_GROUP |
| 5 | OBU_METADATA |
| 6 | OBU_FRAME 204 |
| 7 | OBU_REDUNDANT_FRAME_HEADER |
| 8 | OBU_TILE_LIST |
| 9-14 | Reserved |
| 15 | OBU_PADDING |

*FIG. 2*

OPEN BITSTREAM UNIT (OBU) UNCOMPRESSED HEADER SEMANTICS 1000
(show_existing_frame is not present in a bitstream)

| uncompressed_header( ) { | Type |
|---|---|
| ... | |
| show_frame | f(1) |
| if ( show_frame ) { | |
|    showable_frame = frame_type != KEY_FRAME | |
| } else { | |
|    showable_frame | f(1) |
| } | |
| if ((show_frame == 1 \|\| showable_frame == 1) && | |
|    decoder_model_info_present_flag && !equal_picture_interval ) { | |
|    temporal_point_info( ) | |
| } | |
| ... | |
| } | |

| temporal_point_info( ) { | Type |
|---|---|
| ... | |
| n = frame_presentation_time_length_minus_1 + 1 | |
| frame_presentation_time 1002 | f(n) |
| ... | |
| } | |

*FIG. 10*

OPEN BITSTREAM UNIT (OBU) UNCOMPRESSED HEADER SEMANTICS 1100
(show_existing_frame is present in a bitstream)

| uncompressed_header( ) { | Type |
|---|---|
| ... | |
| show_existing_frame 1102 | f(1) |
| show_frame 1104 | f(1) |
| if ( show_frame ) { | |
|   showable_frame = frame_type != KEY_FRAME | |
| } else { | |
|   showable_frame 1106 | f(1) |
| } | |
| if ((show_existing_frame == 1 \|\| show_frame == 1 \|\| showable_frame == 1) && | |
|   decoder_model_info_present_flag && lequal_picture_interval ) { | |
|   temporal_point_info( ) | |
| } | |
| ... | |
| } | |

| temporal_point_info( ) { | Type |
|---|---|
| ... | |
| n = frame_presentation_time_length_minus_1 + 1 | |
| frame_presentation_time 1108 | f(n) |
| ... | |
| } | |

*FIG. 11*

COMPUTER-IMPLEMENTED METHOD AND APPARATUS FOR VIDEO CODING USING AN IMPLICIT VIDEO FRAME OUTPUT PROCESS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various examples in accordance with the present disclosure will be described with reference to the following drawings.

FIG. 2 is a diagram illustrating open bitstream unit (OBU) type header semantics according to some examples.

FIG. 10 is a diagram illustrating open bitstream unit (OBU) uncompressed header semantics that includes a "frame presentation time" syntax element without a "show existing frame" syntax element according to some examples.

FIG. 11 is a diagram illustrating open bitstream unit (OBU) uncompressed header semantics that includes a "frame presentation time" syntax element and a "show existing frame" syntax element according to some examples.

DETAILED DESCRIPTION

The present disclosure relates to methods, apparatus, systems, and non-transitory computer-readable storage media for video coding using an implicit video frame output process. Certain examples herein are directed to a video coding technology (e.g., method) for coding video that incorporates a novel frame output process. In certain examples, this process does not require explicit signaling for each output frame, e.g., instead, one or more output frames may be determined implicitly from other information available at the decoder. By saving bits that would have been (e.g., exclusively) used for explicit signaling, the implicit signaling of the proposed video coding technology (e.g., method) improves the coding efficiency of a video compression system.

In certain examples, an encoding mode (e.g., with different encoding modes selectable for each macroblock of a frame) is selected for a video encoder, e.g., an encoding mode according to a video coding standard. In one example, the video coding standard is an Advanced Video Coding (AVC) standard, for example, a H.264 standard. In one example, the video coding standard is an Alliance for Open Media (AOM) standard, for example, an AV1, AV2, etc. standard. In certain examples, a video coding process encodes a video so that a decoder (for example, a (e.g., hypothetical) decoder model according to a video coding standard) derives the decoded frames from the encoded video (e.g., syntax elements representing the encoded video). In certain examples, a syntax element is an element of data represented in a bitstream (e.g., generated by an encoder and/or provided to a decoder). In certain examples, the bitstream is packetized into open bitstream units (OBUs) (e.g., OBU(s) according to a video coding standard). In certain examples, each OBU has a header which provides identifying information for the contained data (e.g., the payload).

In certain examples, a video coding standard (e.g., encoding mode and/or decoding mode) does not utilize a show existing frame syntax element (e.g., set to one) (e.g., a show existing frame syntax element within an OBU) to indicate a frame in a reference picture buffer of a decoder is to be displayed. In certain examples, a video coding standard (e.g., encoding and/or decoding mode) is to generate and/or transmit at least one open bitstream unit (OBU) (e.g., a plurality of OBUs) (e.g., generated from an encoded video) without including a show existing frame syntax element to indicate a frame in a reference picture buffer of a decoder is to be displayed. In certain examples, a video coding standard (e.g., encoding mode and/or decoding mode) is modified to not utilize (e.g., is modified to include a mode that does not utilize) a show existing frame syntax element (e.g., set to one) (e.g., a show existing frame syntax element within an OBU) to indicate a frame in a reference picture buffer of a decoder is to be displayed (e.g., next in display order).

Figure 1:
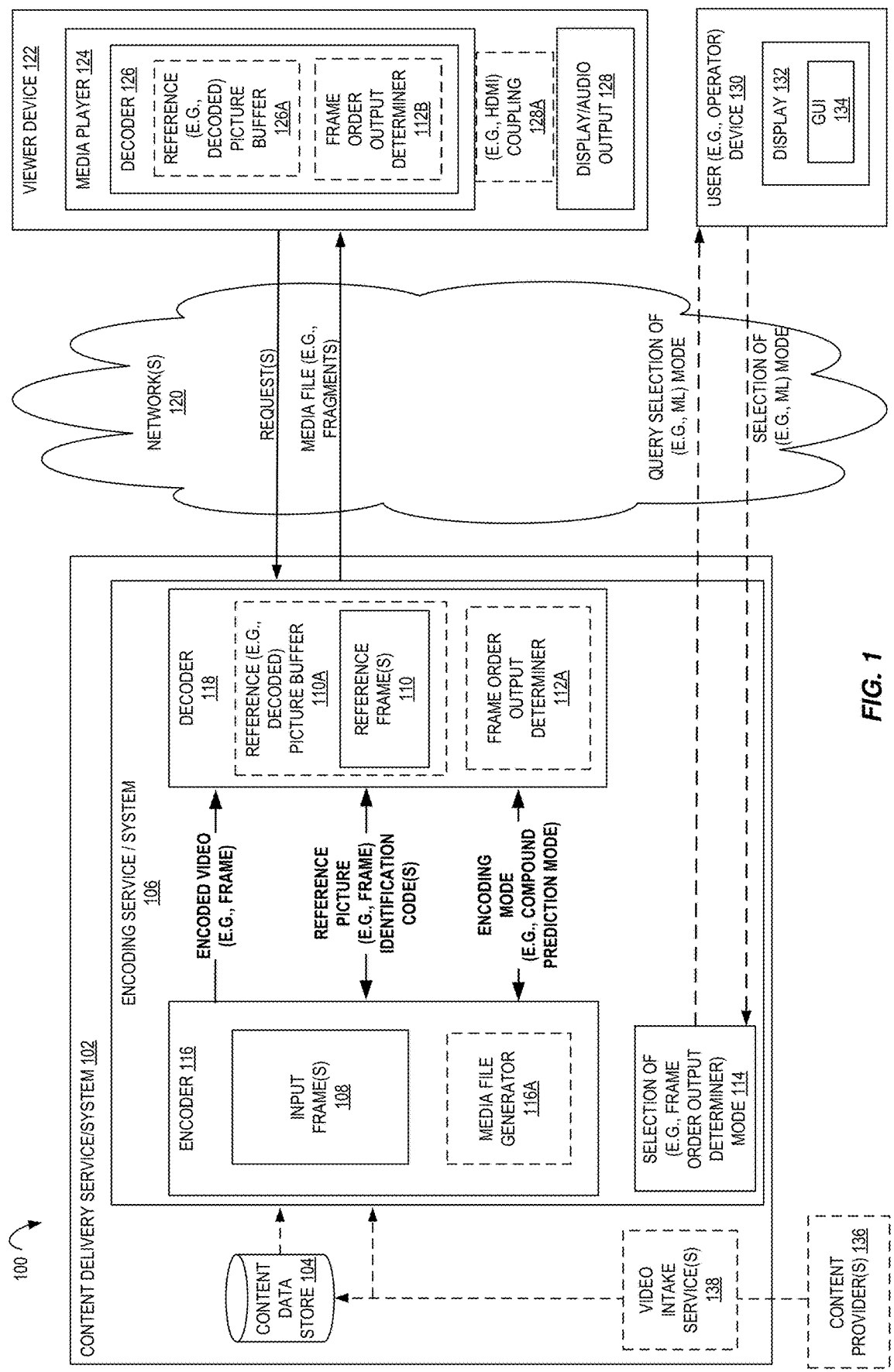
FIG. 1 is a diagram illustrating an environment including a content delivery service/system, having an encoding service/system to encode a media file for decoding by decoder of a viewer device using a frame order output determiner according to some examples.

FIG. 1 is a diagram illustrating an environment including a content delivery service/system 100, having an encoding service/system 106 to encode a media file (e.g., input frame(s) 108) for decoding by decoder 126 of a viewer device 122 using a frame order output determiner 112A and/or 112B according to some examples. In certain examples, video compression (e.g., of a content delivery service/system/service) includes an encoding mode for certain proper subset(s) of the input video. An encoding mode may be in accordance with a video coding (e.g., encoding) standard. A decoding mode may be in accordance with a video coding (e.g., decoding) standard.

Encoding (e.g., by encoder 116) may compress a video file (e.g., input frame(s) 108) into a plurality of compressed frames, for example, one or more an intra-coded picture frames (I-frames) (e.g., with each I-frame as a complete image), one or more predicted picture frames (P-frames or delta-frames) (e.g., with each P-frame having only the changes in the image from the previous frame), and/or one or more bidirectional predicted picture frames (B-frames) (e.g., that further saves space (e.g., bits) by using differences between the current frame and the preceding and/or following frames to specify its content). For example, with P-frames and B-frames being inter-coded pictures. In one example, each single I-frame corresponds to (e.g., is associated with) a plurality of inter-coded frames (e.g., P-frames and/or B-frames), e.g., as a group of pictures (GOP). In certain examples, an encoder selects one or more prediction styles for a slice (e.g., a sequence of macroblocks), for example, switching I (SI) frame (e.g., slice) that facilitates switching between coded streams (e.g., containing SI-macroblocks as a special type of intra coded macroblock and/or switching P (SP) frame (e.g., slice) that facilitates switching between coded streams (e.g., containing contains P and/or I-macroblocks). In certain examples, a slice can be a whole frame, e.g., but it is not required that a whole frame is a slice.

An encoding and/or decoding algorithm (e.g., specified by a video coding standard) may select between inter and intra coding for (e.g., block-shaped) regions of each picture (e.g., frame 108). In certain examples, inter coding (e.g., as indicated by an "inter" mode) uses motion vectors for (e.g., block-based) inter prediction from other pictures (e.g., frames), e.g., to exploit temporal statistical dependencies between different pictures. The reference pictures (e.g., reference frames) 110 may be stored in a reference picture buffer 110A. In certain examples, intra coding (e.g., as indicated by an "intra" mode) uses various spatial predictions to exploit spatial statistical dependencies in the source signal for a single picture (e.g., frame). In certain examples, motion vectors and intra prediction modes are specified for a variety of block sizes in the picture. In certain examples, the prediction residual is then further compressed using a transform to remove spatial correlation inside the transform block before it is quantized, producing an irreversible process that typically discards less important visual information while forming a close approximation to the source samples. In certain examples, the motion vectors or intra prediction modes are combined with the quantized transform coefficient information and encoded, e.g., using either variable length coding or arithmetic coding.

An encoding and/or decoding mode (e.g., to be used to encode and/or decode a particular macroblock of a frame, respectively) may include one, all, or any combination of the following: direct mode, inter mode, or intra mode. A direct mode may cause encoding with an inter prediction for a block for which no motion vector is decoded. Examples of two direct prediction modes are spatial direct prediction mode and temporal prediction mode.

In certain examples, a mode has one or more sub-modes that are to be specified. In same examples, the same (e.g., prediction) mode is used for corresponding chroma (component) and luminance (component) blocks.

For example, a direct mode may include a skip mode (e.g., sub-mode) and/or a B-frame (e.g., B-slice) direct mode (e.g., sub-mode). In one example, skip mode is for P-frames (e.g., P-slices), for example, where the (e.g., spatial direct prediction) motion is derived directly from previously encoded information (e.g., thus not having to encode any additional motion data for a macroblock). In one example, direct mode is for B-frames (e.g., B-slices), for example, where the (e.g., temporal prediction) motion is derived directly from previously encoded information (e.g., thus not having to encode any additional motion data for a macroblock). Previously encoded information may be stored in a reference picture buffer 110A, for example, list 0 (L0) references being a reference picture list used for inter prediction of a P, B, or SP slice (e.g., block). In certain examples, inter prediction used for P and SP slices uses (reference picture) list 0 (L0). Owing to the bi-predictive (e.g., before or after the current frame in video order), a certain (e.g., DIRECT) mode may utilize two motion vectors pointing to different references. In certain examples, inter prediction used for B slices uses (reference picture) list 0 and (reference picture) list 1 (L1).

For example, an inter mode (e.g., sub-mode) may include a (e.g., luminance) block partition size, e.g., 16×16, 16×8, 8×16, or 8×8 (pixels×pixels). An inter mode may use a transform, e.g., a 4×4 transform or 8×8 transform.

For example, an intra mode (e.g., sub-mode) may include a (e.g., luminance) block partition size, e.g., intra4×4, intra8×8 and intra16×16. For example, intra4×4 may include further prediction sub-modes of vertical, horizontal, DC, diagonal-down-left, diagonal-down-right, vertical-right, horizontal-down, vertical-left, and/or horizontal-up.

An encoding mode may be used to encode a particular slice of a frame, e.g., where a slice is a spatially distinct region of a frame that is encoded separately from any other region in the same frame and/or where a slice is a plurality of macroblocks (e.g., a sequence of macroblock pairs).

An encoding mode (e.g., of encoder 116) may be separate from encoder settings, e.g., separate from values setting one, all, or any combination of the following in an encoder: spatial adaptive quantization strength, temporal adaptive quantization strength, flicker reduction, dynamic group-of-pictures (GOP) on/off, number of B-frames (e.g., per GOP), direct mode (e.g., allowing B-frames to use predicted motion vectors instead of actual coding of each frame's motion) (e.g., for a scene), prefilter on/off, delta quantization parameter (QP) offsets (e.g., between I-frame and P-frames/

B-frames), rate distortion optimization quantization (RDOQ), speed settings, or additional configuration (e.g., encoder) settings.

In certain examples (e.g., at the start of the video encoding process) a content delivery service/system/service is to select the encoding modes, e.g., for each macroblock (or slice) of a frame. This may include a mode selection that is to select a (e.g., optimal from a visual quality perspective) single mode by looping through all the available modes by encoding (e.g., by encoder 116) according to a mode then decoding (e.g., by decoder 118) and measuring the quality between the media (e.g., macroblock) that was encoded versus the decoded version.

In certain examples, the encoding service/system 106 (e.g., encoder 116) generates and/or transmits an encoded video (e.g., bitstream) that does not utilize a show existing frame syntax element (e.g., set to one) (e.g., a show existing frame syntax element within an OBU) to indicate a frame in a reference picture buffer (e.g., buffer 110A and/or buffer 126A) of a decoder (e.g., decoder 118 and/or decoder 126) is to be displayed. In certain examples, the encoding service/system 106 (e.g., encoder 116) generates and/or transmits at least one open bitstream unit (OBU) (e.g., generated from the encoded video) without including a show existing frame syntax element to indicate a frame in a reference picture buffer (e.g., buffer 110A and/or buffer 126A) of a decoder (e.g., decoder 118 and/or decoder 126) is to be displayed. Examples of open bitstream unit (OBU) type header semantics are discussed below in reference to FIG. 2.

In certain examples, the encoding service/system 106 (e.g., encoder 116) utilizes a frame order output determiner 112A to determine (e.g., without utilizing a show existing frame syntax element) when a frame in the reference picture buffer 110A of the decoder 118 is ready to be displayed, e.g., as part of generating the OBUs.

In certain examples, the media player 124 (e.g., of viewer device 122) utilizes a frame order output determiner 112B to determine (e.g., without utilizing a show existing frame syntax element) when a (e.g., previously decoded) frame in the reference picture buffer 126A of the decoder 126 is ready to be displayed in display 128, e.g., as part of generating the OBUs. Example frame order output determiner operations are discussed below in reference to FIGS. 8-12.

In certain examples (e.g., for a compound mode), encoder 116 is to encode a frame 108 and send it (e.g., as OBUs) to decoder 118 to decode the encoded frame. In certain examples, a version of the frame 108 is reconstructed out of the bitstream (e.g., OBUs) by the decoder 118. In certain examples, one or more of the decoded frames, from the encoder 116, generated by the decoder 118 is input into reference (e.g., decoded) picture buffer 110A (e.g., decoded frame buffer/list or reference frame buffer/list). In certain examples, the reference frame(s) 110 in the picture buffer 110A (e.g., which is less than all of the frames in a video) are used to encode an input frame 108, for example, via an inter prediction (e.g., prediction value) for the current frame using previously decoded reference frames 110.

Certain (e.g., AOM) coding standards (e.g., codecs) allow a maximum number of (e.g., eight frames) in its reference picture buffer 110A. In certain examples, for encoding a frame 108, encoder 116 can choose a proper subset of (e.g., seven) frames from the reference picture buffer 110A as its reference frames. In certain examples, the bitstream allows the encoding service/system 106 to explicitly assign each reference a unique reference frame index (e.g., ranging from 1 to 7). In some examples, the reference frames indices 1-4 are designated for the frames that precede the current frame in display (e.g., picture or video) order, while indices 5-7 are for reference frames coming after the current one. In certain examples of compound inter prediction, two references can be combined to form the prediction. In certain examples, if both reference frames either precede or follow the current frame, this is a unidirectional compound prediction, e.g., in contrast with a bidirectional compound prediction where there is one previous and one future reference frame in display (e.g., picture or video) order. In certain examples, the encoding service/system 106 (e.g., coding standard thereof) links a reference frame index to any frame in the decoded frame buffer, e.g., which allows it to fill all the reference frame indices when there are not enough reference frames on either side. In certain examples, when a frame coding is complete, the encoding service/system 106 decides which (if any) reference frame in the reference picture buffer 110A to replace, e.g., and explicitly signals this in the bitstream. In certain examples, encoding service/system 106 allows for bypassing of updating the reference picture buffer 110A, e.g., for high motion videos where certain frames are less relevant to neighboring frames.

In certain examples, the reference picture buffer 110A update is implemented through two syntaxes in the frame level: (1) a multiple bit (e.g., eight-bit) reference Refresh Flag, e.g., with each bit signaling whether the corresponding frame in the reference picture buffer 110A is to be refreshed or not by the newly coded frame, and/or (2) virtual index mapping where each of the reference frames is labeled by a unique virtual index, and both the encoder 116 and the decoder 118 maintain a reference frame map to associate a virtual index with the corresponding physical index that points to its location within the reference picture buffer 110A. In certain examples, both the refresh flag and the virtual indices are written into the bitstream, e.g., using such mapping mechanism is to avoid memory copying whenever reference frames are being updated.

In certain examples, encoding service/system 106 includes a field 114, that when set, causes the encoding service/system 106 (e.g., encoder 116 and/or decoder 118) to utilize the functionality discussed herein, for example, to utilize a frame order output determiner (e.g., without utilizing a show existing frame syntax element).

The depicted content delivery service/system 102 includes a content data store 104, which may be implemented in one or more data centers. In one example, the media file (e.g., video file that is to be viewed by the viewer device 122) is accessed (for example, from the content data store 104 or directly from a content provider 136, e.g., as a live stream) by encoder 116 (e.g., by media file (e.g., fragment) generator thereof). In certain examples, the content delivery service/system 102 includes a video intake service(s) 138 to intake a video, e.g., from content provider(s) 136.

In certain examples, the (e.g., client) viewer device 122 requesting the media file (e.g., fragment(s) of media) from content delivery service/system 102 causes the encoder 116 to encode the video file, e.g., into a compressed format for transmittal on network(s) 120 to viewer device 122. In one example, a media file generator 116A of encoder 116 generates one or more subsets (e.g., frames, fragments, segments, scenes, etc.) of the media file (e.g., video), e.g., beginning with accessing the media file and generating the requested media (e.g., fragment(s)). In one example, each fragment includes a plurality of video frames. In one example, a media file generator 116A of encoder 116 generates one or more OBUs from the encoded media file (e.g., video).

In FIG. 1, content delivery service/system 102 is coupled to viewer device 122 and user device 130 via one or more networks 120, e.g., a cellular data network or a wired or wireless local area network (WLAN).

In certain examples, content delivery service/system 102 (e.g., encoding service/system 106 thereof) is to send a query asking for the selection of a mode (e.g., to utilize a frame order output determiner (e.g., without utilizing a show existing frame syntax element)) to user (e.g., operator) device 130, for example, and the user device 130 (e.g., in response to a command from a user of the device 130) is to send a response (e.g., an indication of that mode 114). Depicted user device 130 includes a display 132 having a graphical user interface (GUI) 134, e.g., to display a query for encoding service/system 106 to enter (or not) a particular mode 114, e.g., that utilizes a frame order output determiner (e.g., without utilizing a show existing frame syntax element). In certain examples, a coding standard includes a first mode that does not utilize a show existing frame syntax element to indicate a (e.g., previously decoded) frame in the reference picture buffer is ready to be displayed, and a second mode that utilizes a show existing frame syntax element to indicate a (e.g., previously decoded) frame in the reference picture buffer is ready to be displayed, for example, where a decoder is switchable between the first mode and the second mode.

Depicted viewer device 122 (e.g., where the viewer is a customer of user (e.g., operator) of device 130) includes a media player 124 having a decoder 126 (e.g., separate from decoder 118 of encoding service/system 106) to decode the media file (e.g., fragment) from the content delivery service/system 102, e.g., to display video and/or audio of the media file on display and/or audio output 128, respectively. In certain examples coupling 128A (e.g., according to a High-Definition Multimedia Interface (HDMI) standard) is included to couple display and/or audio output 128 to media player 124 (e.g., when display and/or audio output 128 is separate from viewer device 122).

In certain examples, the (e.g., client) decoder 126 includes frame order output determiner 112B, e.g., to generate OBUs without utilizing a show existing frame syntax element according to this disclosure.

In certain examples, an OBU (e.g., according to an AOM (e.g., AV1, AV2, etc.) specification) include a header and a payload, e.g., where the header identifies the type of the payload using an OBU type (e.g., "obu_type") header parameter. Example OBU header types are discussed below in reference to FIG. 2.

In certain examples, an ordered series of OBUs is presented to the decoding process (e.g., decoder 118 and/or decoder 126 in FIG. 1). In certain examples, each OBU is given to the decoding process as a string of bytes along with a variable size (sz) that identifies the total number of bytes in the OBU. In certain examples, if the syntax element "obu_has_size_field" (e.g., in the OBU header) is equal to 1, then the variable size (sz) will be unused and does not have to be provided. In certain examples, the syntax element "obu_size" indicates the size in bytes of the OBU, e.g., not including the bytes within obu_header or the obu_size syntax element.

FIG. 2 is a diagram illustrating open bitstream unit (OBU) type header semantics 200 according to some examples. In certain examples, OBU type header semantics 200 include one or more (e.g., any combination) of the following types: (1) Sequence Header (e.g., information that applies to the entire sequence, e.g., sequence profile, whether to enable certain coding tools, etc. (2) Temporal Delimiter (e.g., indicating a frame presentation time stamp; where all displayable frames following a temporal delimiter OBU will use this time stamp, until the next temporal delimiter OBU arrives; in certain examples, a temporal delimiter and its subsequent OBUs of the same time stamp are referred to as a temporal unit; in certain examples, the compression data associated with all representations of a frame at various spatial and fidelity resolutions will be in the same temporal unit), (3) Frame Header 202 (for example, indicating the coding information for a given frame, e.g., including signaling inter or intra frame type, indicating the reference frames, signaling probability model update method, etc.), (4) Tile Group (e.g., indicating the tile data associated with a frame; e.g., where each tile can be independently decoded; in certain examples, the collective reconstructions form the reconstructed frame after potential loop filtering), (5) Metadata (e.g., indicating high dynamic range, content light level, display color volume, scalability, timecode, etc.) (6) Frame 204 (e.g., indicates the frame header and tile data; in certain examples, the frame OBU is substantially equivalent to a frame header OBU and a tile group OBU, but allows less overhead cost), (7) Redundant Frame Header (e.g., where the first frame header for a frame has an obu_type equal to OBU_FRAME_HEADER, and later copies of this frame header (if present) have obu_type equal to OBU_REDUNDANT_FRAME_HEADER), (8) Tile List (e.g., tile data similar to a tile group OBU, but each tile has an additional header that indicates its reference frame index and position in the current frame; e.g., this allows the decoder to process a subset of tiles and display the corresponding part of the frame without the need to fully decode all the tiles in the frame).

In certain examples, (e.g., AV1) frame headers can be classified in two main types based on the value of a "show existing frame" syntax element ("show_existing_frame"). In certain examples, frame headers with show_existing_frame equal to zero ("0") are frames that are to be decoded, for example, that to-be-decoded frame is not already a decoded frame within a reference (e.g., decoded) picture buffer, e.g., that to-be-decoded frame is not a decoded frame within the reference picture buffer 126A of the decoder 126 in FIG. 1. In certain examples, frame headers with show_existing_frame equal to one ("1") specify a command to display a previously decoded frame (e.g., indicated by frame_to_show_map_idx) (e.g., at the presentation time specified in this frame header), for example, to display the decoded frame that is already stored within a reference (e.g., decoded) picture buffer, e.g., the decoded frame that is a decoded frame within the reference picture buffer 126A of the decoder 126 in FIG. 1. Thus, the "show existing frame" syntax element ("show_existing_frame") is utilized in certain examples to implement frame reordering, e.g., when the decoding order is different from the display order.

Video Compression

In certain examples, video compression systems include video encoding, video decoding, and video postprocessing (e.g., via post-processor 312) operations. In certain examples, a video encoder receives one or more images (or equivalently frames or pictures) with one or more color channels as input and generates a bit-stream as output. In certain examples, the video decoder receives all or part of the bit-stream as input and generates one or more images as output. These output pictures are similar to the images received by the encoder but may not be identical. A video post-processor is optional but receives the pictures generated by the decoder as input and generates enhanced pictures as output. An example video compression system is shown in FIG. 3 (e.g., an overview of a video compression system 300).

Figure 3:
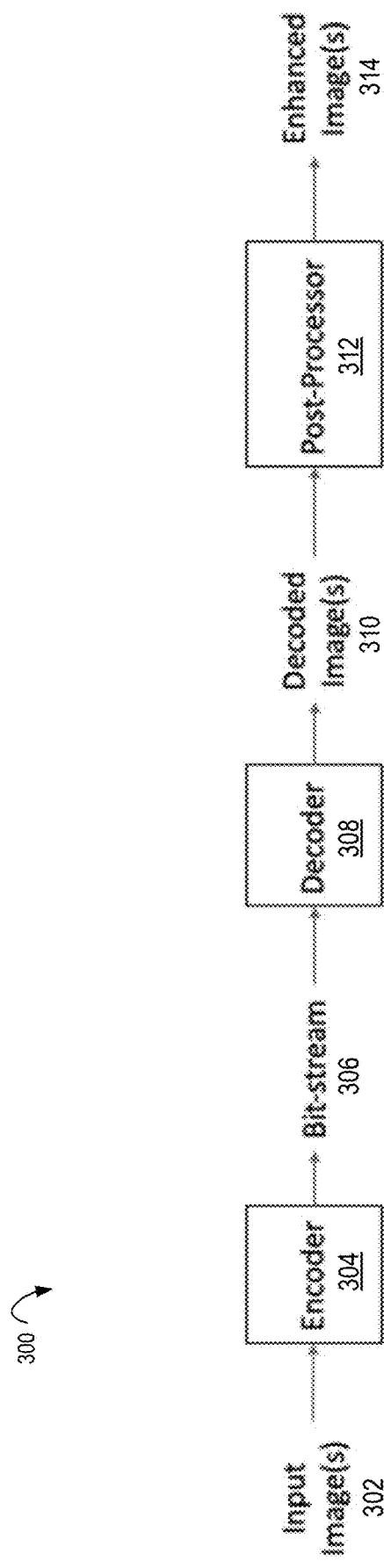
FIG. 3 is a diagram illustrating a video compression system including an encoder and a decoder according to some examples.

FIG. 3 is a diagram illustrating a video compression system 300 including an encoder 304 and a decoder 308 according to some examples. In certain examples, encoder 304 is an instance of encoder 116. In certain examples, decoder 308 is an instance of decoder 126. In certain examples, decoder 308 is an instance of decoder 118.

In certain examples, encoder 304 receives an input of image(s) (e.g., frame(s) of a video) and generates an output of a bit-stream 306 (e.g., coded bitstream of the video). In certain examples, decoder 308 receives an input of a bit-stream 306 (e.g., coded bitstream of the video) and generates an output of decoded image(s) 310 (e.g., decoded frame(s) of the video). In certain examples, video compression system 300 outputs enhanced image(s) 314. In certain examples, an (optional) post-processor 312 receives an input of decoded image(s) 310 (e.g., decoded frame(s) of the video) and generates an output of enhanced image(s) 314 (e.g., enhanced decoded frame(s) of the video).

Video compression systems may use a video coding standard (e.g., the H.264, HEVC, VVC, VP9 or AV1 standards) to describe one or more of the bit-stream, decoder, encoder, or post-processor. In certain examples, the video coding standard defines the construction of the bit-stream and/or the decoding process. An example video encoder is shown in FIG. 4.

Figure 4:
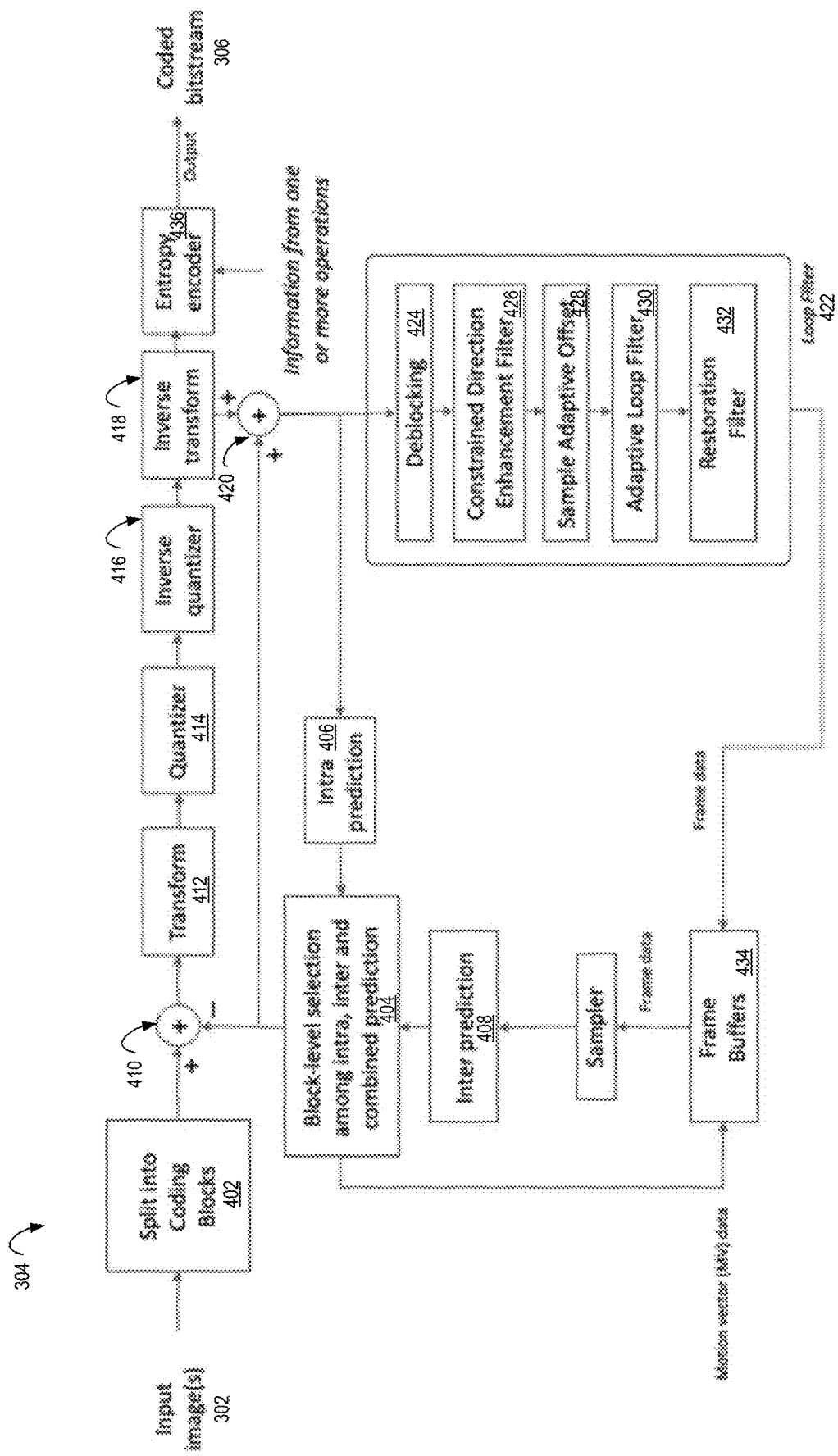
FIG. 4 is a diagram illustrating a video encoder according to some examples.

FIG. 4 is a diagram illustrating a video encoder 304 according to some examples. As can be seen in FIG. 4, the encoder 304 receives an image as input and split operation 402 divides the image into spatial regions for coding. These spatial regions may be referred to as macro-blocks, super-blocks, coding tree units, or other terms known to those skilled in the art. In certain examples, the spatial regions are then further partitioned. For example, each super-block (e.g., in AV1) may be recursively split into coding blocks ranging in size (e.g., from 128×128 samples to 4×4 samples) and/or with square and/or rectangular shapes. Furthermore, the spatial regions may also be combined into larger spatial regions referred to as tiles, slices, or other terms known to those skilled in the art.

Figure 5:
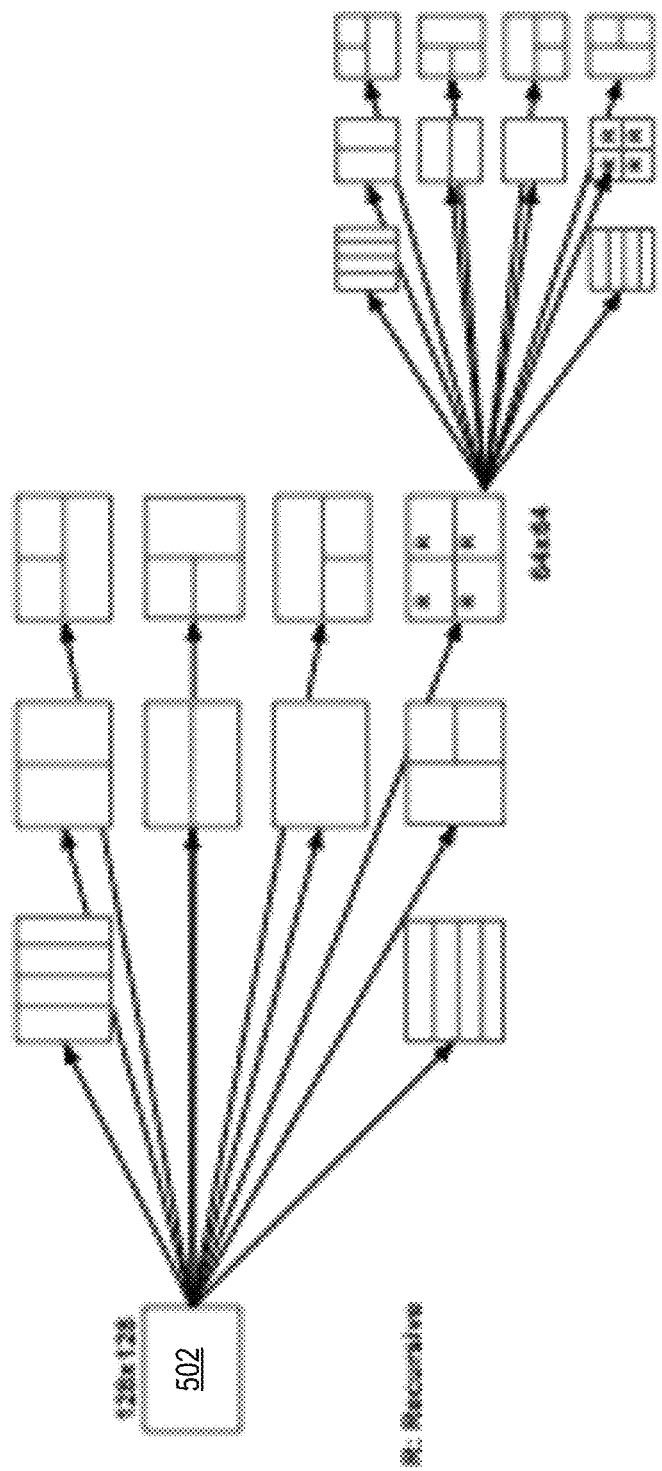
FIG. 5 is a diagram illustrating partitioning of a larger block (e.g., super-block) into smaller blocks (e.g., coding blocks) according to some examples.

Both may be done either jointly or independently for the color channels. An example of partitioning shapes (e.g., partitioning of a super-block into coding blocks) is shown in FIG. 5. FIG. 5 is a diagram illustrating partitioning of a larger block (e.g., super-block) 502 into smaller blocks (e.g., coding blocks) according to some examples. In certain examples, a sample (or pixel) corresponds to a specific location within a frame and color channel. For two-dimensional images, this specific location may be a horizontal and vertical index into the color channel of the frame, e.g., which stores the value for the image at that index.

Returning to FIG. 4, in certain examples, each coding block is first predicted using either intra frame prediction, inter frame prediction, or a combination of the predictions at 404. In certain examples, intra frame prediction 406 predicts a current coding block from previously coded and spatially neighboring blocks. This prediction may be done with directional intra prediction that predicts the sample values of the current coding block by extrapolating previously coded information along a prediction direction. The prediction may also be done with non-directional intra-prediction, such as non-directional smooth intra prediction, recursive intra-prediction, intra block copy and color palette techniques.

In certain examples, inter frame prediction 408 uses information from previously coded frames for prediction that are stored in one or more frame buffers. One method for performing this prediction uses a translational motion model. In this approach, the spatial offsets (or motion vectors) between the current coding block and a previously decoded frame are used to translate a region of the previously coded frame and use the translated version for prediction. Different precisions for the motion vectors are possible, such as ⅛ pixel motion vector accuracy. And different interpolation filters can also be selected. In addition to a translational motion approach, alternative methods (or prediction models) for performing inter frame prediction include affine motion compensation and overlapped block motion compensation. Moreover, one or more of these models may predict the current coding block from more than one previously coded locations in previously decoded frames. One example is the compound prediction mode in AV1. Strategies for combining the more than one prediction include computing a weighted average based on the temporal distance between each previously coded block and the current coded block. In the case that the previously coded frame is a different resolution than the input frame, a sampler may optionally convert the spatial resolution of a previously coded frame.

In some video coding systems, it is possible to use a combination of intra frame and inter-frame prediction for a current coded block. For example, a coding block may be divided into two regions. And the first region predicted using an intra frame prediction method and the second region using an inter frame prediction region. As a second example, an intra frame prediction and an inter frame prediction may be averaged to predict the current coding block.

Following the prediction of each block, residual information may be added at 410 to the prediction. An encoder 304 may first calculate a difference between the prediction and the original frame data 302, apply an optional transform 412 to the difference, and quantize 414 the coefficients that are output by the transform. In certain examples, at both an encoder and a decoder, the residual is computed by de-quantizing 416 (e.g., an inverse quantization) the quantized coefficients computed by an encoder, applying an optional inverse transform 418 to de-quantized coefficients, and adding at 420 the result of the inverse transform to the predicted block. Note that the sequential process of quantization and de-quantization may not result in the same output as the input that was provided to the quantization process. Similarly, the sequential process of a transform followed by an inverse transform may not result in the same output as the input that was provided to the transform.

The reconstructed block corresponding to the addition of the prediction and residual information may then be processed by one or more in-loop filters 422 (or operations). In certain examples, these filters improve the fidelity of reconstructed blocks and may include processes such as deblocking filters 424, constrained directional enhancement filter (CDEF) 426, sample adaptive offset filters 428, adaptive loop filters 430, and/or loop restoration filters 432. These operations may use different partitioning than the reconstructed blocks.

In certain examples, the output (e.g., improved image) of the one or more loop (e.g., in-loop) filters 422 is stored in a frame buffer 434 (or decoded picture buffer) for use in the inter prediction of coding blocks in different frames. In certain examples, frame buffer 434 is an instance of buffer 110A in FIG. 1. Additionally, the output may be processed by out-of-loop filters (or operations) to further modify the output. Examples of these filters (or postprocessing filters) include spatial resizing, color conversion, film grain synthesis, and debanding operations. In certain examples, that result is not stored in the decoded picture buffer.

Information computed during the encoding process may be signaled in a bit-stream 306. For example, the partitioning of regions for coding, intra prediction directions, motion vectors, quantized transform coefficients, and in-loop filter control information may be signaled. In certain examples, this information is sent (e.g., without loss) using an entropy coding system (e.g., entropy encoder 436). In certain examples, the encoder 436 takes as input information from one or more of the depicted operations, e.g., quantized values that are output from quantizer 414. In certain examples (e.g., AV1), the entropy coding system using a M-ary arithmetic coder. In certain examples (e.g., VVC), the entropy coding system uses a context-adaptive binary arithmetic coder. In certain examples, the information is then extracted from the bit-stream by the decoder.

Figure 6:
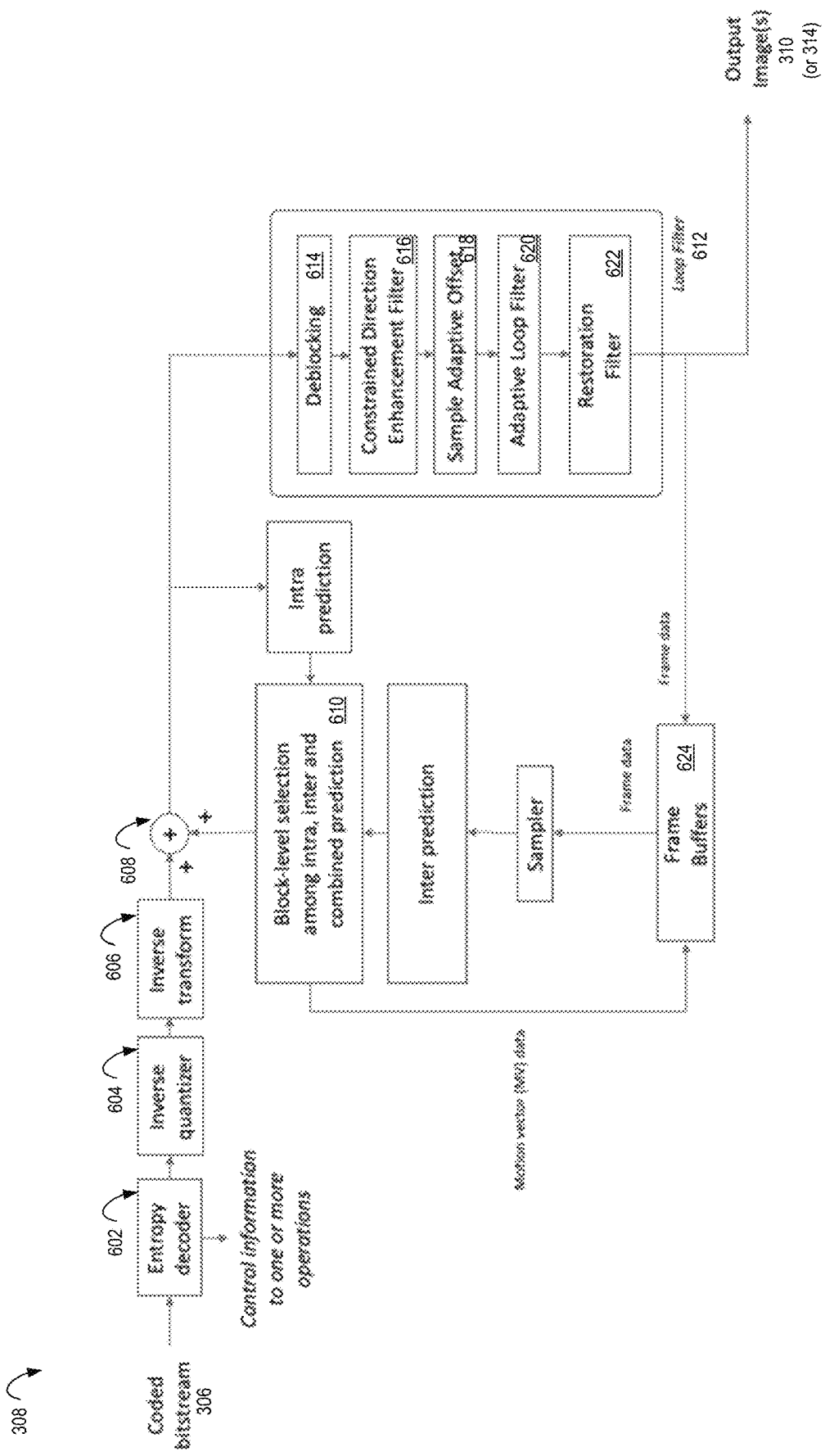
FIG. 6 is a diagram illustrating a video decoder according to some examples.

FIG. 6 is a diagram illustrating a video decoder 308 according to some examples. As described above, in certain examples the video decoder 308 takes a coded bit-stream 306 as input and decodes the bit-stream using an entropy decoder 602. In certain examples, the entropy decoder 602 generates quantized coefficients as output and also control information for other operations within the decoder. In certain examples, the quantized coefficients are inverse quantized at 604 and (optionally) inverse transformed at 606 to generate a residual. In certain examples, the residual is added at 608 to a block-level prediction that is generated by an intra prediction, inter prediction, or combined prediction process 610. In certain examples, following the addition, the resulting sample values are processed by a loop filter 612. Example loop filter 612 operations include one or any combination of deblocking 614, constrained directional enhancement filter (CDEF) 616, sample adaptive offset (e.g., CCSO) 618, adaptive loop filter 620, and/or restoration filter 622. In certain examples, the loop filter output is stored in one or more frame buffers 624, e.g., to be used by the inter prediction process and/or provided as output from the decoder 308. In certain examples where the data stored in the frame buffer 624 does not have the same spatial resolution as a current frame, the data stored in the frame buffer may be resampled by the inter prediction process to the same resolution as the current frame. In certain examples, frame buffer 624 is an instance of buffer 126A in FIG. 1.

In certain examples, video compression systems include video encoding and video decoding operations. A video encoder receives one or more images (or equivalently frames or pictures) as input and generates a bit-stream as output. The video decoder receives all or part of the bit-stream as input and generates one or more images as output. These output pictures are similar to the images received by the encoder but may not be identical.

Example video compression systems include H.264, HEVC, VVC, VP9 and AV1. In certain of these systems, the video encoder typically receives an image as input and divides the image into spatial regions for coding. These spatial regions may be referred to as macro-blocks, super-blocks, coding tree units or other terms known to those skilled in the art. The spatial regions are then further partitioned. For example, each super-block in AV1 may be recursively split into coding blocks ranging in size from 128×128 samples to 4×4 samples and with both square and rectangular shapes. For clarity, a sample (or pixel) corresponds to a specific location within a frame. For two-dimensional images, this specific location may be a horizontal and vertical index into the frame image, which stores the value for the image at that index.

In certain examples, each coding block is first predicted using either intra frame prediction, inter frame prediction or a combination of the predictions. Intra frame prediction predicts a current coding block from previously coded and spatially neighboring blocks. This prediction may be done with directional intra prediction that predicts the sample values of the current coding block by extrapolating previously coded information along a prediction direction. The prediction may also be done with non-directional intra-prediction, such as non-directional smooth intra prediction, recursive intra-prediction, intra block copy and color palette techniques.

Inter frame prediction uses information from previously coded frames for prediction. One method for performing this prediction uses a translational motion model. In this approach, the spatial offsets (or motion vectors) between the current coding block and a previously decoded frame are used to translate a region of the previously coded frame and use the translated version for prediction. Different precision for the motion vectors is possible, such as ⅛ pixel motion vector accuracy. And different interpolation filters can also be selected. In addition to a translational motion approach, alternative methods for performing inter frame prediction include affine motion compensation and overlapped block motion compensation. Moreover, one or more of these models may be employed to predict the current coding block from more than one previously coded locations in previously decoded frames. One example is the compound prediction mode in AV1.

Strategies for combining the more than one prediction includes computing a weighted average based on the temporal distance between each previously coded block and the current coded block.

In some video coding systems, it is possible to use a combination of intra frame and inter frame prediction for a current coded block. For example, a coding block may be divided into two regions. And the first region predicted using an intra frame prediction method and the second region using an inter frame prediction region. As a second example, an intra frame prediction and an inter frame prediction may be averaged (e.g., via a weighted average) to predict the current coding block.

Following the prediction of each block, residual information may be added to the prediction. At an encoder, the residual may be computed by calculating the difference between the prediction and the original frame data, applying an optional transform to the difference, and quantizing the coefficients that are output by the transform. At a decoder, the residual is computed by de-quantizing the coefficients computed by an encoder, applying an optional inverse transform the to de-quantized coefficients, and adding the result of the inverse transform to the predicted block. Note that the sequential process of quantization and de-quantization may not result in the same input that was provided to the quantization process. Similarly, the sequential process of a transform followed by an inverse transform may not result in the same input that was provided to the transform.

The reconstructed block corresponding to the addition of the prediction and residual information may then be processed by one or more in-loop filters (or operations). These filters improve the fidelity of the reconstructed blocks and include processes such as deblocking filters, constrained directional enhancement filter, sample adaptive offset filters, adaptive loop filters and loop restoration filters. These operations may use different partitioning than the reconstructed blocks.

One specific example of an in-loop filter is the super-resolution filter (e.g., in an AV1 standard). This super-resolution filter takes samples as input and provides a higher resolution version of the samples in the spatial domain as output. In certain examples (e.g., AV1), the resolution is increased in the horizontal direction only, e.g., and may be increased by up to a factor of two times the input resolution. The result may then be processed by subsequent in-loop filters. The factor of resolution increase may be signaled in the bit-stream by an encoder and received in the bit-stream by a decoder.

The output of the one or more in-loop filters may be stored in a decode picture buffer for use in the inter prediction of coding blocks in different frames. Additionally, the output may be processed by out-of-loop filters to further modify the output.

Examples of these filters include spatial resizing, color conversion, film grain synthesis, and debanding operations. In certain examples, the result is not stored in the decoded picture buffer.

Information computed during the encoding process may be signaled in a bit-stream. For example, the partitioning of regions for coding, intra prediction directions, motion vectors, quantized transform coefficients and in-loop filter control information may be signaled. In certain examples, this information is sent without loss using an entropy coding system. In certain examples (e.g., AV1), the entropy coding system uses a M-ary arithmetic coder. In certain examples (e.g., VVC), the entropy coding system uses a context-adaptive binary arithmetic coder. In certain examples, the information is then extracted from the bit-stream by the decoder.

Problem Statement

There are aspects of certain video coding that are less than ideal. For example, a video encoder may signal frames in an order different from the order the frames should be displayed, e.g., necessitating an indication of both the (i) encoding and/or decoding order and (ii) the display order to a video decoder. When sent explicitly, this order information requires bits and can decrease the coding efficiency of a video coding system.

For example, in certain video coding, the frame output process is controlled by syntax elements that are signaled in a frame header, e.g., "frame" 202 type of header in FIG. 2. In certain examples, the usable syntax elements include the following: (i) show_frame, (ii) showable_frame, (iii) show_existing_frame, and (iv) frame_to_show_map_idx. In certain examples, a show_frame syntax element equal to 1 specifies that the currently decoded frame is output immediately after decoding and a show_frame syntax element equal to 0 specifies that the frame is not output immediately after decoding. In certain examples, a showable_frame syntax element equal to 1 specifies that the currently decoded frame is stored in a decoded picture buffer and may be output later, e.g., using a show_existing_frame syntax element. In certain examples, a show_existing_frame syntax element equal to 1 specifies that a previous showable frame (e.g., showable_frame==1) (e.g., indexed by frame_to_show_map_idx syntax element) is to be output from the decoded picture buffer, and show_existing_frame equal to 0 specifies that a decoding process of the coded block data is required. In certain examples, frame_to_show_map_idx syntax element specifies the frame to be output (e.g., as an index (idx) to the particular decoded picture buffer slot that stores that specified frame), e.g., and the frame_to_show_map_idx syntax element is only available if show_existing_frame is 1.

Figure 7:
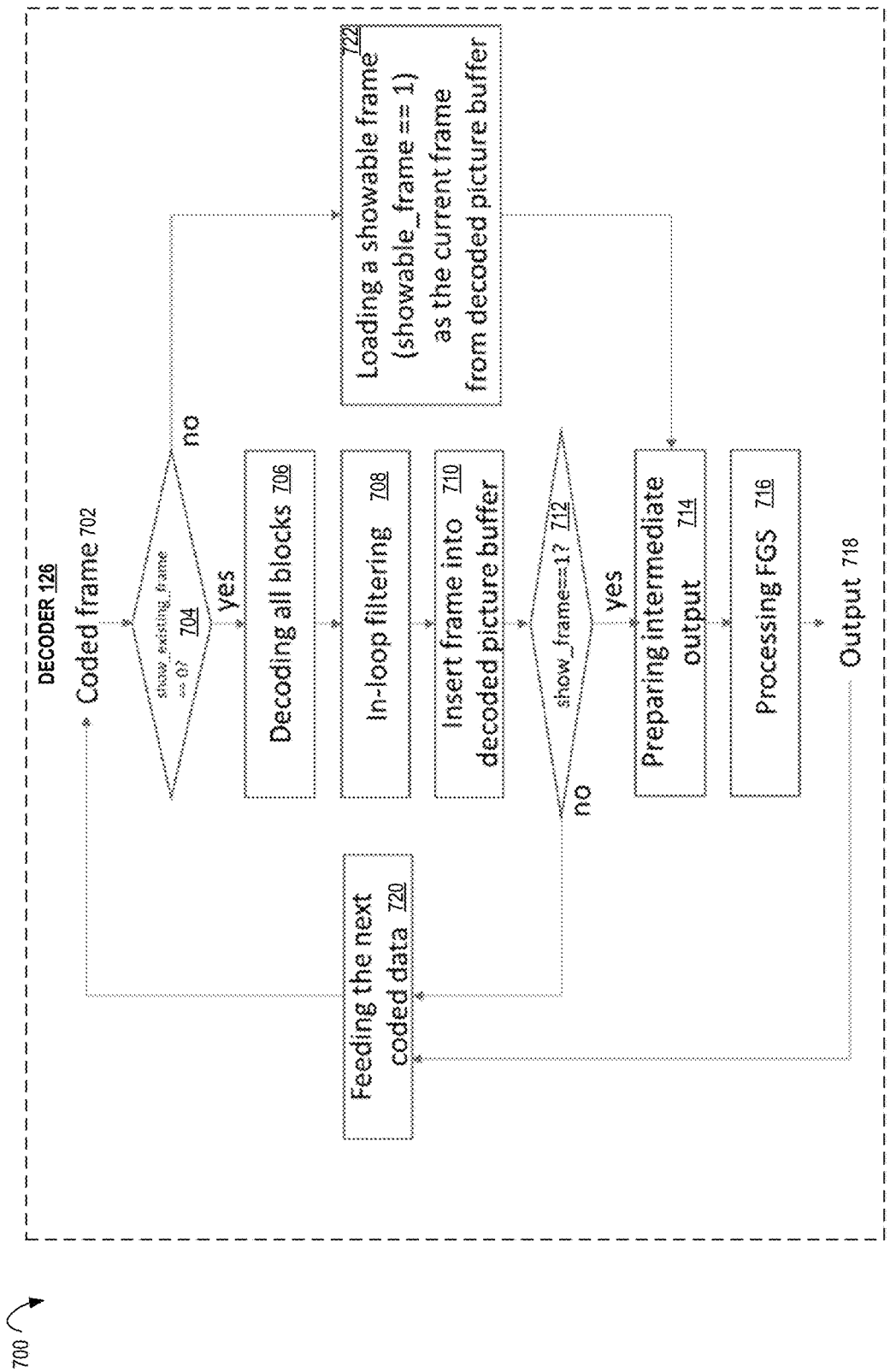
FIG. 7 is a flow diagram illustrating operations of a method using a "show existing frame" syntax element (e.g., set to one) to indicate a frame in a reference picture buffer of a decoder is to be displayed according to some examples.

FIG. 7 is a flow diagram illustrating operations 700 of a method using a "show existing frame" syntax element (e.g., set to one) to indicate a frame in a reference picture buffer of a decoder (e.g., reference picture buffer 126A of decoder 126 and/or reference picture buffer 110A of decoder 118 in FIG. 1) is to be displayed according to some examples. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 700 are performed by a decoder 126 (or decoder 118) of the other figures.

The operations 700 include, at block 704, checking if an input of a coded frame 702 (e.g., a corresponding OBU header for that frame) includes a "show existing frame" syntax element set to zero (e.g., zero indicating that frame is not stored in the decoded picture buffer), and if yes, proceeding to block 706, and if no, proceeding to block 722. The operations 700 further include, at block 706, decoding all frame blocks. The operations 700 further include, at block 708, performing a filtering (e.g., in-loop filtering). The operations 700 further include, at block 710, inserting the decoded and filtered frame into the decoded picture buffer. The operations 700 further include, at block 712, checking if an input of a coded frame 702 (e.g., a corresponding OBU header for that frame stored in the decoded picture buffer) includes a "show frame" syntax element set to one, and if yes, proceeding to block 714, and if no, proceeding to block 720. The operations 700 further include, at block 722, loading a showable frame (e.g., in response to the "showable frame" syntax element for that frame being set to one) as the current frame from the decoded picture buffer and then proceeding to block 714. The operations 700 further include, at block 714, preparing an intermediate output. The operations 700 further include, at block 716, processing that output, e.g., by performing film grain synthesis (e.g., to add in film grain) to generate output 718. The operations 700 further include, at block 720, feeding the next coded data in as an input of a coded frame 702.

FIG. 7 illustrates a (e.g., AV1) frame output mechanism using syntax elements discussed herein. In certain examples, the operations 700 begin by determining the value of a show_existing_frame syntax element. If it is equal to 0 (or false), then the frame is first reconstructed (e.g., by decoding all blocks and performing in-loop filtering) and stored in a decoded picture buffer. Then, the operations 700 determine the value of a show_frame syntax element. If it is equal to 1 (or true), the reconstructed frame is output (e.g., immediately after decode), which may include additional processing such as, but not limited to, applying a film grain synthesis (FGS) operation (e.g., by post-processor 312 in FIG. 3). When the show_existing_syntax element is determined to not be 0, a frame from the decoded picture buffer is determined and output. In some cases, the determined frame corresponds to a showable_frame syntax element that is equal to 1.

However, a technical problem with utilizing a specific syntax element (e.g., show existing frame) that (e.g., only) explicitly indicates when to display a decoded frame that is already stored within a reference (e.g., decoded) picture buffer utilizes bandwidth, processing resources, processing time, etc. that are overcome by instead using the novel frame output process disclosed herein (e.g., to determine the display order that is different than the decoding order). Another technical problem with the output mechanism in FIG. 7 is that OBUs with show_existing_frame equal to 1 are required to be signaled for any frame associated with a show_frame syntax element equal to 0. This OBU signaling may impact coding efficiency. For example, an encoder may use a hierarchical coding structure that results in half of the frames being signaled with the show_frame syntax element equal to 0. In certain examples, each frame coded with the show_frame syntax element equal to 0 then requires an additional OBU (e.g., with a header but no payload) with a show_existing_frame syntax element equal to 1 using the output mechanism in FIG. 7, and these additional OBUs require additional bits to be transmitted and reduce the coding efficiency of the video compression system. This becomes especially problematic for low bitrate streaming. In all cases, reducing coding efficiency also impacts the visual quality of the video coding system at a given bit-rate.

Another problem with the output mechanism in FIG. 7 is that not all OBUs may be received by a video decoder due to loss, e.g., during transmission. In certain examples, once an OBU with show_existing_frame equal to 1 is lost, the corresponding showable frame cannot be output. This further reduces the visual quality of the video coding system at a given bit-rate.

Figure 8:
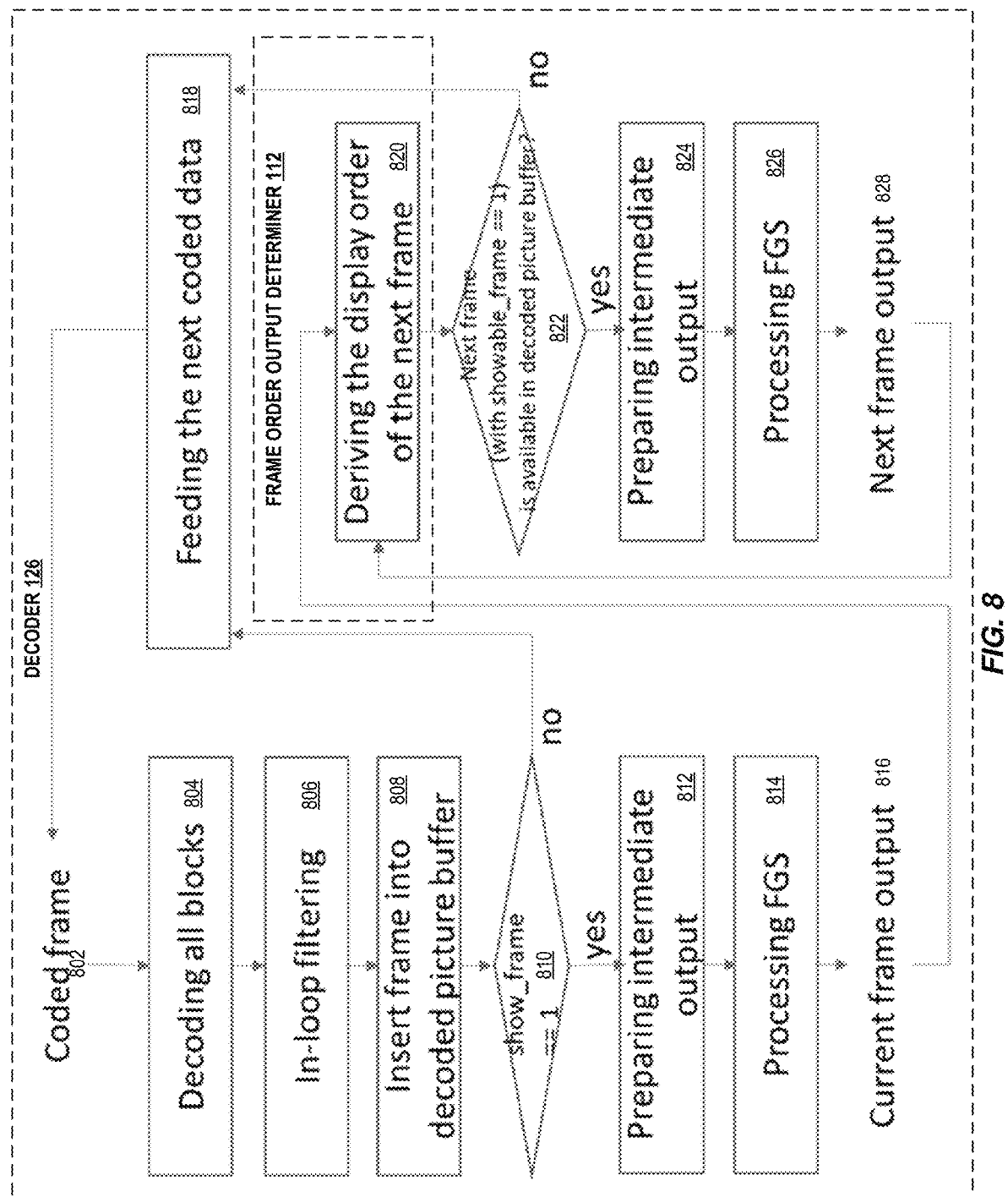
FIG. 8 is a flow diagram illustrating operations of a method without using a "show existing frame" syntax element (e.g., set to one) to indicate a frame in a reference picture buffer of a decoder is to be displayed according to some examples.
Figure 9:
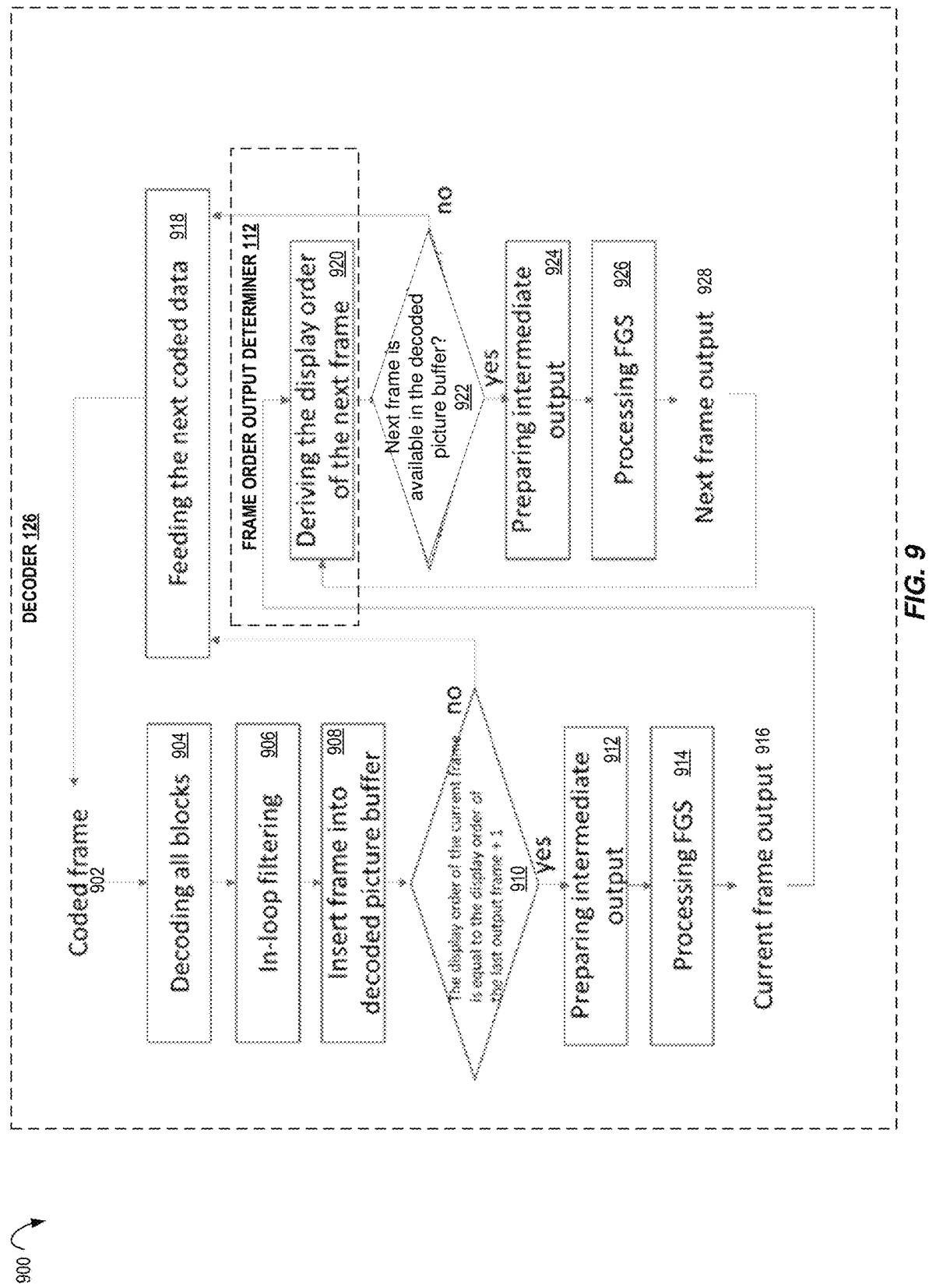
FIG. 9 is a flow diagram illustrating operations of a method without using a "show existing frame" syntax element (e.g., set to one), a "showable frame" syntax element (e.g., set to one), or a "show frame" syntax element (e.g., set to one) to indicate a frame in a reference picture buffer of a decoder is to be displayed according to some examples.

As a technical solution to these technical problems, examples herein are directed to a frame output mechanism that does not require the explicit transmission of OBUs with the show_existing_frame syntax element equal to 1. Instead, in certain examples herein, the output mechanism determines the frame output order implicitly from information available to a decoder. In one example, this information is an order hint ("OrderHint") variable, e.g., that is derived from an "order_hint" syntax element. In another example, this information is a temporal hint, e.g., a temporal hint that is used for temporal motion prediction. In yet other examples, this information is a picture order count, frame identifier (e.g., frame number), display index, and/or time stamp, e.g., as discussed below. FIGS. 8-9 illustrate example operations to determine the frame output order from information available to a decoder, e.g., without utilizing an OBU with show_existing_frame equal to 1. In certain examples, a mode to determine the frame output order is selectable between a first mode that does not utilize a show existing frame syntax element, and a second mode that utilizes a show existing frame syntax element, for example, where a decoder is switchable between the first mode and the second mode. In certain examples, a mode to determine the frame output order is selectable between a first mode (e.g., as in FIG. 8 or 9) and a second mode (e.g., as in FIG. 7), for example, where a decoder is switchable between the first mode and the second mode.

FIG. 8 is a flow diagram illustrating operations 800 of a method without using a "show existing frame" syntax element (e.g., set to one) to indicate a frame in a reference picture buffer of a decoder is to be displayed according to some examples. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 800 are performed by a decoder 126 (or decoder 118) of the other figures. In certain examples, one or more of operations 800 is performed by a frame order output determiner 112 (e.g., frame order output determiner 112A and/or frame order output determiner 112B).

The operations 800 include, at block 804, decoding all frame blocks for a coded frame 802. The operations 800 further include, at block 806, performing a filtering (e.g., in-loop filtering). The operations 800 further include, at block 808, inserting the decoded and filtered frame into the decoded picture buffer. The operations 800 further include, at block 810, checking if an input of a coded frame 802 (e.g., a corresponding OBU header for the frame) includes a "show frame" syntax element set to one, and if yes, proceeding to block 812, and if no, proceeding to block 818. The operations 800 further include, at block 818, feeding the next coded data in as an input of a coded frame 802. The operations 800 further include, at block 812, preparing an intermediate output. The operations 800 further include, at block 814, processing that output, e.g., by performing film grain synthesis (e.g., to add in film grain) to generate current frame output 816. The operations 800 further include, at block 820, deriving the display order of the next frame (e.g., without utilizing an OBU with show_existing_frame equal to 1). In certain examples, block 820 is performed by a frame order output determiner 112, e.g., that operates according to this disclosure.

The operations 800 further include, at block 822, checking if the next frame (for example, in display order, e.g., that is different than decoding order) is available in the decoded picture buffer, for example, by checking if the next frame includes a "show frame" syntax element set to one (e.g., a corresponding OBU header for that next frame) includes a "show frame" syntax element set to one, and if yes, proceeding to block 824, and if no, proceeding to block 818. The operations 800 further include, at block 824, preparing an intermediate output for the next frame (e.g., from the decoded picture buffer). The operations 800 further include, at block 826, processing that output, e.g., by performing film grain synthesis (e.g., to add in film grain) to generate next frame output 828.

In certain examples, the operations 800 begin by reconstructing (e.g., by decoding all blocks and (optionally) performing in-loop filtering) a frame and storing it in a decoded picture buffer. In certain examples, then, the operations 800 determine the value of a show_frame syntax element. In certain examples, if it is equal to 1, the reconstructed frame is output, which may include additional processing such as, but not limited to, applying a film grain synthesis (FGS) operation. In certain examples, the information available to the decoder that corresponds to the next frame in display order is determined. In certain examples, the operations at block 820 determines if any frame in the decoded picture buffer corresponds to this determined information (e.g., and also corresponds to a showable_frame syntax element equal to 1). In certain examples, if such a corresponding frame is determined to be in the decoded picture buffer, the corresponding frame is output. In certain examples, if such a corresponding frame is not determined to be in the decoded picture buffer, then the operations 800 reconstruct another frame and stores it in the decoded picture buffer. The following includes three non-limiting examples to determine if any frame in the decoded picture buffer corresponds to a next frame in display order (e.g., and also corresponds to a showable_frame syntax element equal to 1).

In a first example, the process of determining (e.g., by frame order output determiner 112) if any frame in the decoded picture buffer corresponds to a next frame in display order and also corresponds to a showable_frame syntax element equal to 1 is shown in the following pseudo-code:

```
num_output_frame=1
successive_output_num=1
for (k=1; k<=REF_FRAME_NUM && successive_output_num>0; k++) {
   next_frame_disp_order=cur_disp_order_hint+k
   successive_output_num=0
   for (i=0; i<REF_FRAME_NUM; i++) {
      if(reference_frame_buf[i]
         →display_order_hint==next_frame_disp_order
         && reference_frame_buf[i]→showable_frame==1)
      {
      output_frame[k]=reference_frame_buf[i]
      num_output_frame++
      successive_output_num++
      }
   }
}
``` where REF_FRAME_NUM denotes the number of reference frames in a decoded picture buffer, cur_disp_order_hint denotes information available to the decoder that corresponds to the current frame in display order (e.g., a value in a range (e.g., 0-15)), next_frame_disp_order denotes information available to the decoder that corresponds to the next frame in display order, reference_frame_buf[i] denotes the i-th picture stored in the decoded picture buffer, reference_frame_buf[i]→display_order_hint denotes information available to the decoder that corresponds to the display order of the i-th picture stored in the decoded picture buffer, reference_frame_buf[i]→showable_frame denotes a value for the showable_frame syntax element corresponding to the i-stored in the decoded picture buffer, and output[ ] is an array of frames (e.g., pictures) output by the process, respectively. In certain examples, this assumes every frame is sent.

In certain examples, the cur_disp_order_hint value is within a range (e.g., 0-15) that is less than the total number of frames in a video, e.g., and a counter is used to track the actual frame index (e.g., display order) based on the cur_disp_order_hint.

In a second example, the process of determining (e.g., by frame order output determiner 112) if any frame in the decoded picture buffer corresponds to a next frame in display order and corresponds to a showable_frame syntax element equal to 1 is shown in the following pseudo-code:

```
num_output_frame=1
successive_output_num=1
for (k=1; k<=REF_FRAME_NUM && successive_output_num>0; k++) {
   next_frame_disp_order=cur_disp_order_hint+k*t
   successive_output_num=0
   for (i=0; i<REF_FRAME_NUM; i++) {
      if(reference_frame_buf[i]
         →display_order_hint==next_frame_disp_order
         && reference_frame_buf[i]→showable_frame==1) {
      output_frame[k]=reference_frame_buf[i]
      num_output_frame++
      successive_output_num++
      }
   }
}
``` where t is a variable that denotes the temporal frame interval between output frames (e.g., if t equals two, only every other frame is output, if t equals three, only every third frame is output, etc.). In one example, this variable is indicated by one or more syntax elements in a bit-stream. In one example, the one or more syntax elements are signaled at a sequence level. In another example, the one or more syntax elements are signaled at a frame level. In yet another example, the values of the one or more syntax elements differ between frames to support a variable frame rate.

In certain examples, information indicating the number and/or display order of frames to be output are received in a bit-stream (e.g., in the OBUs). In one example, this information corresponds to the syntax element "num_next_showable_frames" that denotes the number of next consecutive showable frames and the syntax element "next_order_hint[i]" that denote the order hint information of the i-th consecutive showable frame in the decoded picture buffer pool.

In a third example, the process of determining (e.g., by frame order output determiner 112) if any frame in the decoded picture buffer corresponds to a next frame in display order and also corresponds to a showable_frame_ syntax element equal to 1 is shown in the following pseudo-code:

```
num_output_frame=1
successive_output_num=1
for (k=0; k<num_next_showable_frames; k++) {
   next_frame_disp_order=cur_disp_order_hint+next_order_hint[k]
   for (i=0; i<REF_FRAME_NUM; i++) {
      if(reference_frame_buf[i]
         →display_order_hint==next_frame_disp_order
         && reference_frame_buf[i]→showable_frame==1) {
      output_frame[k]=reference_frame_buf[i]
      num_output_frame++
      }
   }
}
```

In certain examples, the next_order_hint[i] variable denotes the difference between the order hint information of the i-th next showable frame and the (i−1)-th next showable frame (where i is an integer greater than or equal to zero) (e.g., for an irregular frame interval).

In one or more of the examples above, the frame output mechanism (e.g., frame order output determiner 112) is enabled when a value is determined to be equal to true. In one example, the value is determined to be equal to true when order_hint syntax elements are received in a bit-stream. In another example, the value is determined to be equal to true when an enable_order_hint syntax element is true. In yet another example, the value is equal to true when a variable OrderHintBits is equal to 0. In certain examples, when the value is determined to be equal to false, an alternative frame output mechanism is enabled.

In an example, the syntax elements show_frame, showable_frame, and show_existing_frame are not present in a bitstream and not used for derivation of output order at decoder. In certain examples, a key frame (e.g., I-frame) is handled (e.g., treated) as a frame with show_frame equal to 1 by a decoder and the display order of subsequent frames is implicitly derived from order_hint information, e.g., as described above. In certain of these examples, decoding a frame triggers the frame output process shown in FIG. 9.

FIG. 9 is a flow diagram illustrating operations 900 of a method without using a "show existing frame" syntax element (e.g., set to one), a "showable frame" syntax element (e.g., set to one), or a "show frame" syntax element (e.g., set to one) to indicate a frame in a reference picture buffer of a decoder is to be displayed according to some examples. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 900 are performed by a decoder 126 (or decoder 118) of the other figures. In certain examples, one or more of operations 900 is performed by a frame order output determiner 112 (e.g., frame order output determiner 112A and/or frame order output determiner 112B).

The operations 900 include, at block 904, decoding all frame blocks for a coded frame 902. The operations 900 further include, at block 906, performing a filtering (e.g., in-loop filtering). The operations 900 further include, at block 908, inserting the decoded and filtered frame into the decoded picture buffer. The operations 900 further include, at block 910, checking if the display order of the current frame is equal to the display order of the last output frame plus one (e.g., instead of checking if a "show frame" syntax element is set to one), and if yes, proceeding to block 912, and if no, proceeding to block 918. The operations 900 further include, at block 918, feeding the next coded data in as an input of a coded frame 902. The operations 900 further include, at block 912, preparing an intermediate output. The operations 900 further include, at block 914, processing that output, e.g., by performing film grain synthesis (e.g., to add in film grain) to generate current frame output 916. The operations 900 further include, at block 920, deriving the display order of the next frame (e.g., without utilizing show_existing_frame, show_frame, and/or showable_frame syntax elements). In certain examples, block 920 is performed by a frame order output determiner 112, e.g., that operates according to this disclosure.

The operations 900 further include, at block 922, checking if the next frame (for example, in display order, e.g., that is different than decoding order) is available in the decoded picture buffer, and if yes, proceeding to block 924, and if no, proceeding to block 918. The operations 900 further include, at block 924, preparing an intermediate output for the next frame (e.g., from the decoded picture buffer). The operations 900 further include, at block 926, processing that output, e.g., by performing film grain synthesis (e.g., to add in film grain) to generate next frame output 928.

In certain examples, the frame output process is triggered by checking whether the current display order derived from order_hint information is equal to the display order of the last output frame plus one (+1) (or plus k (+k), where k indicates the frame interval), or not. In certain examples, if the current display order is the same as the last output frame order plus 1 (or plus k), the frame output process is triggered for the current frame and other frames stored in the decoded picture buffer. In certain of these examples, the syntax element showable_frame is present in a bitstream, in order to indicate that the frame is used as a reference frame, but not outputted for display at this time (e.g., the frame is stored in the decoded picture buffer for future use).

FIG. 10 is a diagram illustrating open bitstream unit (OBU) uncompressed header semantics 1000 that includes a "frame presentation time" syntax element 1002 without a "show existing frame" syntax element according to some examples.

In certain examples, the "frame_presentation_time" syntax element 1002, which indicates the frame presentation time, is included in a frame header (e.g., an uncompressed header). In an example that contains the syntax elements "show_frame" and "showable_frame" in the bitstream (e.g., OBUs), the frame_presentation_time is signaled when show_frame is equal to 1 or showable_frame is equal to 1, as shown in FIG. 10. In certain examples, the value of the "frame_presentation_time" syntax element 1002 is used for derivation of the presentation time of the frame.

In certain examples, the frame_presentation_time syntax element 1108 is present in an OBU with show_frame 1104 equal to one, e.g., as a modification to a video encoding standard.

In certain examples, a decoder uses a different number of time units (e.g., decoder clock ticks (DecCT)) than the time units in a display (e.g., display clock ticks (DispCT)).

In certain examples, the "frame_presentation_time" syntax element 1002 specifies the presentation time of the frame in clock ticks (e.g., in DispCT), e.g., counted from the removal time of the last random access point for the operating point that is being decoded. In certain examples, the "frame_presentation_time" syntax element is signaled as a fixed length unsigned integer with a length in bits given by frame_presentation_time_length_minus_1+1. In certain examples, the frame_presentation_time is the remainder of a modulo 1<<(frame_presentation_time_length_minus_1+1) counter.

In certain examples, when the value of the syntax element equal_picture_interval is equal to 0, the decoder may operate in variable frame rate mode, e.g., and the frame presentation time at decoder is determined as follows:

PresentationTime[0]=InitialPresentationDelayPresentationTime[j]=InitialPresentationDelay+
(frame_presentation_time[j]-frame_presentation_time[0])*DispCT When equal_picture_interval is equal to 1, the decoder may operate in the constant frame rate mode, e.g., and the frame_presentation_time is determined as follows:

PresentationTime[0]=InitialPresentationDelay PresentationTime[j]=PresentationTime[j−1]+(num_ticks_per_picture_minus_1+1)*DispCT where PresentationTime[j−1] refers to the previous frame in presentation (e.g., display) order. In certain examples, the presentation interval, e.g., the time interval between the display of consecutive frames j and j+1 in presentation order, is determined as follows:

PresentationInterval[j]=PresentationTime[j+1]−PresentationTime[j]

FIG. 11 is a diagram illustrating open bitstream unit (OBU) uncompressed header semantics 1100 that includes a "frame_presentation_time" syntax element 1108 and a "show existing frame" syntax element 1102 according to some examples.

In another example where the bitstream includes a show_existing_frame syntax element 1102, show_frame syntax element 1104, and showable_frame syntax element 1106, the frame_presentation_time is signaled (e.g., used) when show_existing_frame 1102 is equal to 1, show_frame 1104 is equal to 1, or showable_frame 1106 is equal to 1.

In certain examples, when the frame_presentation_time syntax element 1108 is present both in an OBU with showable_frame 1106 equal to 1 and an OBU with show_existing_frame 1102 equal to 1, which are associated with the same coded frame, the values of frame_presentation_time in those OBUs are required to be the same in a bitstream.

In certain examples, when the frame_presentation_time syntax element 1108 is present both in an OBU with showable_frame 1106 equal to 1 and an OBU with show_existing_frame 1102 equal to 1, which are associated with the same coded frame, the value of frame_presentation_time 1108 in the OBU with showable_frame 1106 equal to 1 is ignored and the value of frame_presentation_time 1108 in the OBU with show_existing_frame 1102 equal to 1 is used for derivation of the frame presentation time.

In certain examples, when the frame_presentation_time syntax element 1108 is not utilized, the frame presentation time information may be presented in a system-level container format, such as, but not limited to, a metadata box in a segment format or in a real-time-transfer protocol (RTP) payload format. In certain examples, when the frame presentation time is present in a container format, the order of the frame presentation time is required to be aligned with the order of order_hint information in the associated bitstream.

Figure 12:
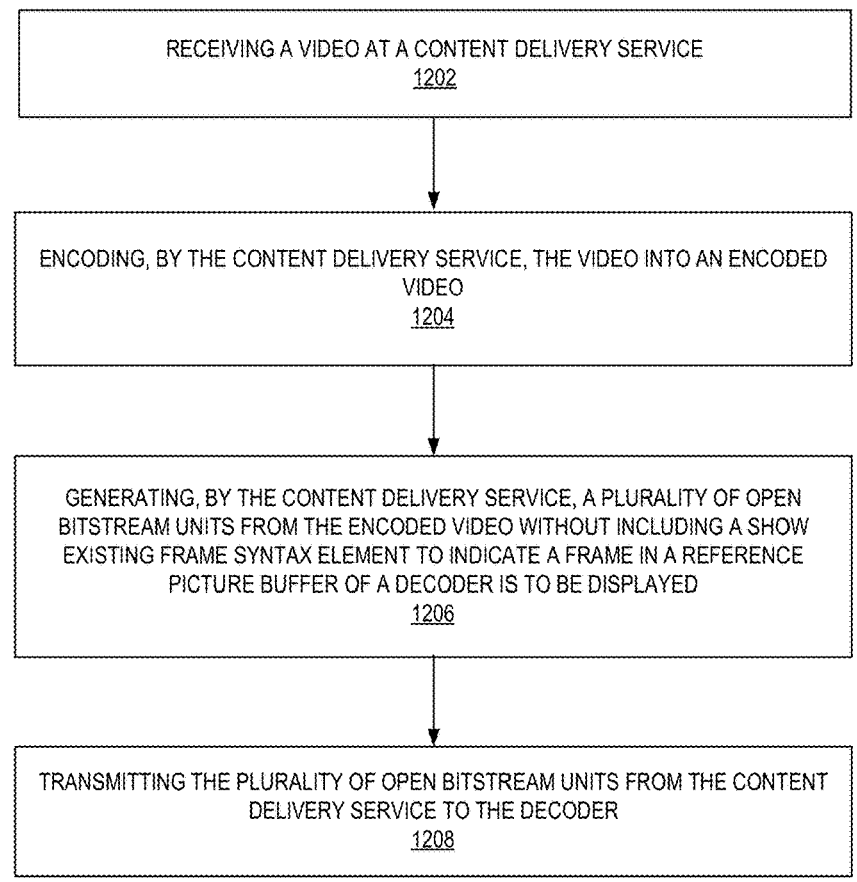
FIG. 12 is a flow diagram illustrating operations of a method of generating at least one open bitstream unit from an encoded video without including a "show existing frame" syntax element to indicate a frame in a reference picture buffer of a decoder is to be displayed according to some examples.

FIG. 12 is a flow diagram illustrating operations 1200 of a method of generating at least one open bitstream unit from an encoded video without including a "show existing frame" syntax element to indicate a frame in a reference picture buffer of a decoder is to be displayed according to some examples. Some or all of the operations 1200 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 1200 are performed by a content delivery system 102 (e.g., implemented in a provider network) of the other figures.

The operations 1200 include, at block 1202, receiving a video at a content delivery service. The operations 1200 further include, at block 1204, encoding, by the content delivery service, the video into an encoded video. The operations 1200 further include, at block 1206, generating, by the content delivery service, at least one open bitstream unit from the encoded video without including a show existing frame syntax element to indicate a frame in a reference picture buffer of a decoder is to be displayed. The operations 1200 further include, at block 1208, transmitting the at least one open bitstream unit from the content delivery service to the decoder.

At least some examples of the disclosed technologies can be described in view of the following examples:

Example 1. A computer-implemented method comprising:
receiving a video at a content delivery service;
encoding, by the content delivery service, the video into an encoded video;
generating, by the content delivery service, at least one open bitstream unit (e.g., according to a video coding format) from the (e.g., entire) encoded video according to a video coding format (e.g., the same video coding format as the at least one open bitstream unit) that does not utilize a show existing frame syntax element set to one to indicate a frame in a reference picture buffer of a decoder is to be displayed; and
transmitting the at least one open bitstream unit from the content delivery service to the decoder.

Example 2. The computer-implemented method of example 1, wherein the generating, by the content delivery service, the at least one open bitstream unit from the encoded bitstream is according to the video coding format that utilizes a display order hint to indicate the frame in the reference picture buffer of the decoder is to be displayed.

Example 3. The computer-implemented method of example 2, wherein the generating, by the content delivery service, the at least one open bitstream unit from the encoded bitstream is according to the video coding format that further utilizes a showable frame syntax element to indicate the frame in the reference picture buffer of the decoder is to be displayed.

Example 4. A computer-implemented method comprising:
receiving a video at a content delivery service;
encoding, by the content delivery service, the video into an encoded video;
generating, by the content delivery service, at least one open bitstream unit from the encoded video without including a show existing frame syntax element to indicate a frame in a reference picture buffer of a decoder is to be displayed; and
transmitting the at least one open bitstream unit from the content delivery service to the decoder.

Example 5. The computer-implemented method of example 4, wherein the generating, by the content delivery service, the at least one open bitstream unit from the encoded bitstream utilizes a display order hint to indicate the frame in the reference picture buffer of the decoder is to be displayed.

Example 6. The computer-implemented method of example 5, wherein the generating, by the content delivery service, the at least one open bitstream unit from the encoded bitstream further utilizes a showable frame syntax element to indicate the frame in the reference picture buffer of the decoder is to be displayed.

Example 7. The computer-implemented method of example 5, wherein the display order hint is a value within a range that is less than a total number of frames in the video.

Example 8. The computer-implemented method of example 4, wherein the generating, by the content delivery service, the at least one open bitstream unit from the encoded video is without including a showable frame syntax element.

Example 9. The computer-implemented method of example 8, wherein the generating, by the content delivery service, the at least one open bitstream unit from the encoded video is without including a show frame syntax element.

Example 10. The computer-implemented method of example 4, wherein the generating, by the content delivery service, the at least one open bitstream unit from the encoded video is without including a show frame syntax element.

Example 11. The computer-implemented method of example 4, wherein the generating, by the content delivery service, the at least one open bitstream unit from the encoded bitstream utilizes a picture order count to indicate the frame in the reference picture buffer of the decoder is to be displayed.

Example 12. The computer-implemented method of example 4, wherein the generating, by the content delivery service, the at least one open bitstream unit from the encoded bitstream utilizes a frame identifier (e.g., frame number) to indicate the frame in the reference picture buffer of the decoder is to be displayed.

Example 13. The computer-implemented method of example 4, wherein the generating, by the content delivery service, the at least one open bitstream unit from the encoded bitstream utilizes a time stamp to indicate the frame in the reference picture buffer of the decoder is to be displayed.

Example 14. The computer-implemented method of example 13, wherein the time stamp is a frame_presentation_time syntax element.

Example 15. An apparatus comprising:
a coupling to a display; and
a video decoder to:
 receive at least one open bitstream unit, of an encoded video, that do not include a show existing frame syntax element that indicates a decoded frame in a reference picture buffer of the video decoder is to be displayed,
 generate the decoded frame based on the at least one open bitstream unit of the encoded video,
 store the decoded frame in the reference picture buffer of the video decoder,
 determine, based on other information available to the video decoder, that the decoded frame in the reference picture buffer of the video decoder is to be displayed, and
 transmit the decoded frame from the reference picture buffer of the video decoder to the coupling for displaying on the display.

Example 16. The apparatus of example 15, wherein the other information comprises a display order hint in the at least one open bitstream unit.

Example 17. The apparatus of example 16, wherein the display order hint is a value within a range that is less than a total number of frames in the video.

Example 18. The apparatus of example 15, wherein the at least one open bitstream unit does not include a showable frame syntax element.

Example 19. The apparatus of example 15, wherein the at least one open bitstream unit does not include a show frame syntax element.

Example 20. The apparatus of example 15, wherein the other information comprises a frame presentation time syntax element.

Example 21. A computer-implemented method comprising:
receiving a first frame of a video;
determining the first frame is not to be output for display in response to a decode;
decoding the first frame into a decoded first frame;
storing the decoded first frame in a reference picture buffer;
receiving a second frame of the video;
determining the second frame is to be output for display in response to a decode;
decoding the second frame into a decoded second frame;
transmitting the second frame to a coupling to a display;
determining, based on other information available at the video decoder besides a show existing frame syntax element, that the first frame is to be displayed; and
transmitting the decoded first frame to the coupling in response to the determining based on the other information available at the video decoder besides the show existing frame syntax element.

Exemplary environments, systems, etc. that the above may be used in are detailed below.

Figure 13:
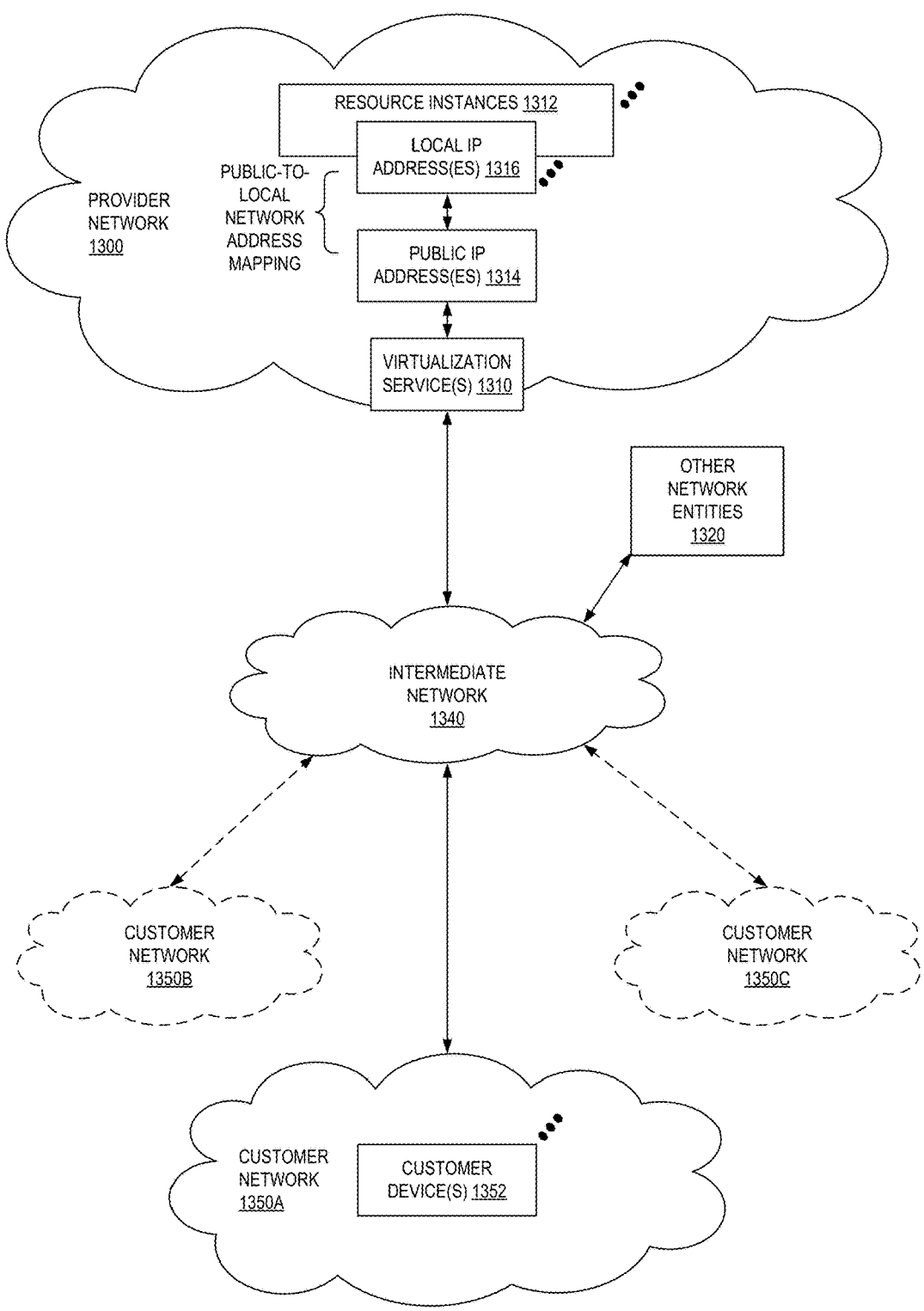
FIG. 13 illustrates an example provider network environment according to some examples.

FIG. 13 illustrates an example provider network (or "service provider system") environment according to some examples. A provider network 1300 may provide resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 may be associated with the resource instances 1312; the local IP addresses are the internal network addresses of the resource instances 1312 on the provider network 1300. In some examples, the provider network 1300 may also provide public IP addresses 1314 and/or public IP address ranges (e.g., Internet Protocol version 4 (IPv4) or Internet Protocol version 6 (IPv6) addresses) that customers may obtain from the provider 1300.

Conventionally, the provider network 1300, via the virtualization services 1310, may allow a customer of the service provider (e.g., a customer that operates one or more client networks 1350A-1350C including one or more customer device(s) 1352) to dynamically associate at least some public IP addresses 1314 assigned or allocated to the customer with particular resource instances 1312 assigned to the customer. The provider network 1300 may also allow the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of customer network(s) 1350A-1350C may, for example, implement customer-specific applications and present the customer's applications on an intermediate network 1340, such as the Internet. Other network entities 1320 on the intermediate network 1340 may then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 may be routed via the network substrate back onto the intermediate network 1340 to the source entity 1320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 1300; a customer may then assign their allocated public IP addresses to particular resource instances allocated to the customer. These public IP addresses may be referred to as customer public IP addresses, or simply customer IP addresses. Instead of being assigned by the provider network 1300 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 14:
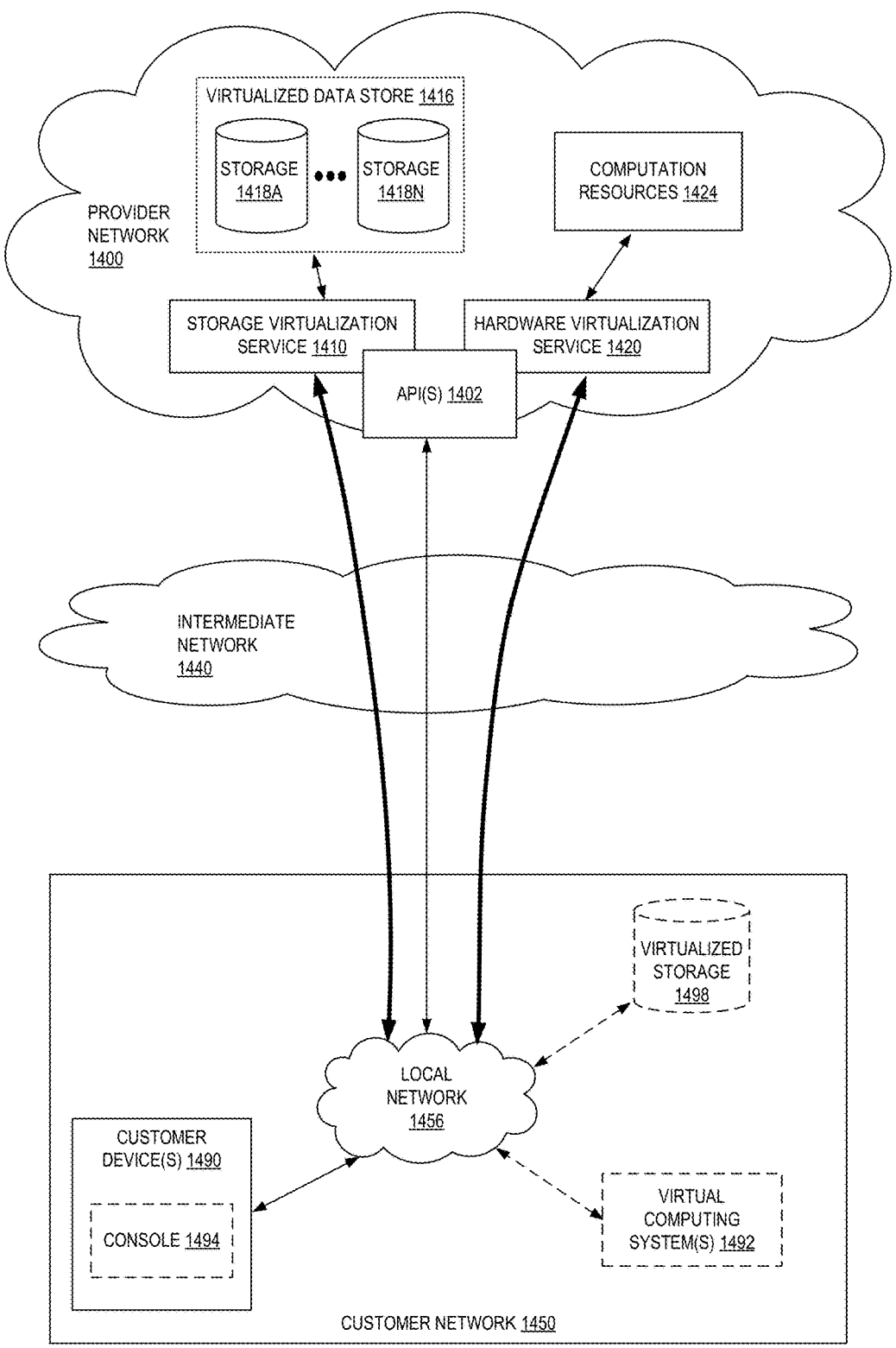
FIG. 14 is a block diagram of an example provider network that provides a storage service and a hardware virtualization service to customers according to some examples.

FIG. 14 is a block diagram of an example provider network that provides a storage service and a hardware virtualization service to customers, according to some examples. Hardware virtualization service 1420 provides multiple computation resources 1424 (e.g., VMs) to customers. The computation resources 1424 may, for example, be rented or leased to customers of the provider network 1400 (e.g., to a customer that implements customer network 1450). Each computation resource 1424 may be provided with one or more local IP addresses. Provider network 1400 may be configured to route packets from the local IP addresses of the computation resources 1424 to public Internet destinations, and from public Internet sources to the local IP addresses of computation resources 1424.

Provider network 1400 may provide a customer network 1450, for example coupled to intermediate network 1440 via local network 1456, the ability to implement virtual computing systems 1492 via hardware virtualization service 1420 coupled to intermediate network 1440 and to provider network 1400. In some examples, hardware virtualization service 1420 may provide one or more APIs 1402, for example a web services interface, via which a customer network 1450 may access functionality provided by the hardware virtualization service 1420, for example via a console 1494 (e.g., a web-based application, standalone application, mobile application, etc.). In some examples, at the provider network 1400, each virtual computing system 1492 at customer network 1450 may correspond to a computation resource 1424 that is leased, rented, or otherwise provided to customer network 1450.

From an instance of a virtual computing system 1492 and/or another customer device 1490 (e.g., via console 1494), the customer may access the functionality of storage service 1410, for example via one or more APIs 1402, to access data from and store data to storage resources 1418A-1418N of a virtual data store 1416 (e.g., a folder or "bucket", a virtualized volume, a database, etc.) provided by the provider network 1400. In some examples, a virtualized data store gateway (not shown) may be provided at the customer network 1450 that may locally cache at least some data, for example frequently-accessed or critical data, and that may communicate with storage service 1410 via one or more communications channels to upload new or modified data from a local cache so that the primary store of data (virtualized data store 1416) is maintained. In some examples, a user, via a virtual computing system 1492 and/or on another customer device 1490, may mount and access virtual data store 1416 volumes via storage service 1410 acting as a storage virtualization service, and these volumes may appear to the user as local (virtualized) storage 1498.

While not shown in FIG. 14, the virtualization service(s) may also be accessed from resource instances within the provider network 1400 via API(s) 1402. For example, a customer, appliance service provider, or other entity may access a virtualization service from within a respective virtual network on the provider network 1400 via an API 1402 to request allocation of one or more resource instances within the virtual network or within another virtual network.

Illustrative System

Figure 15:
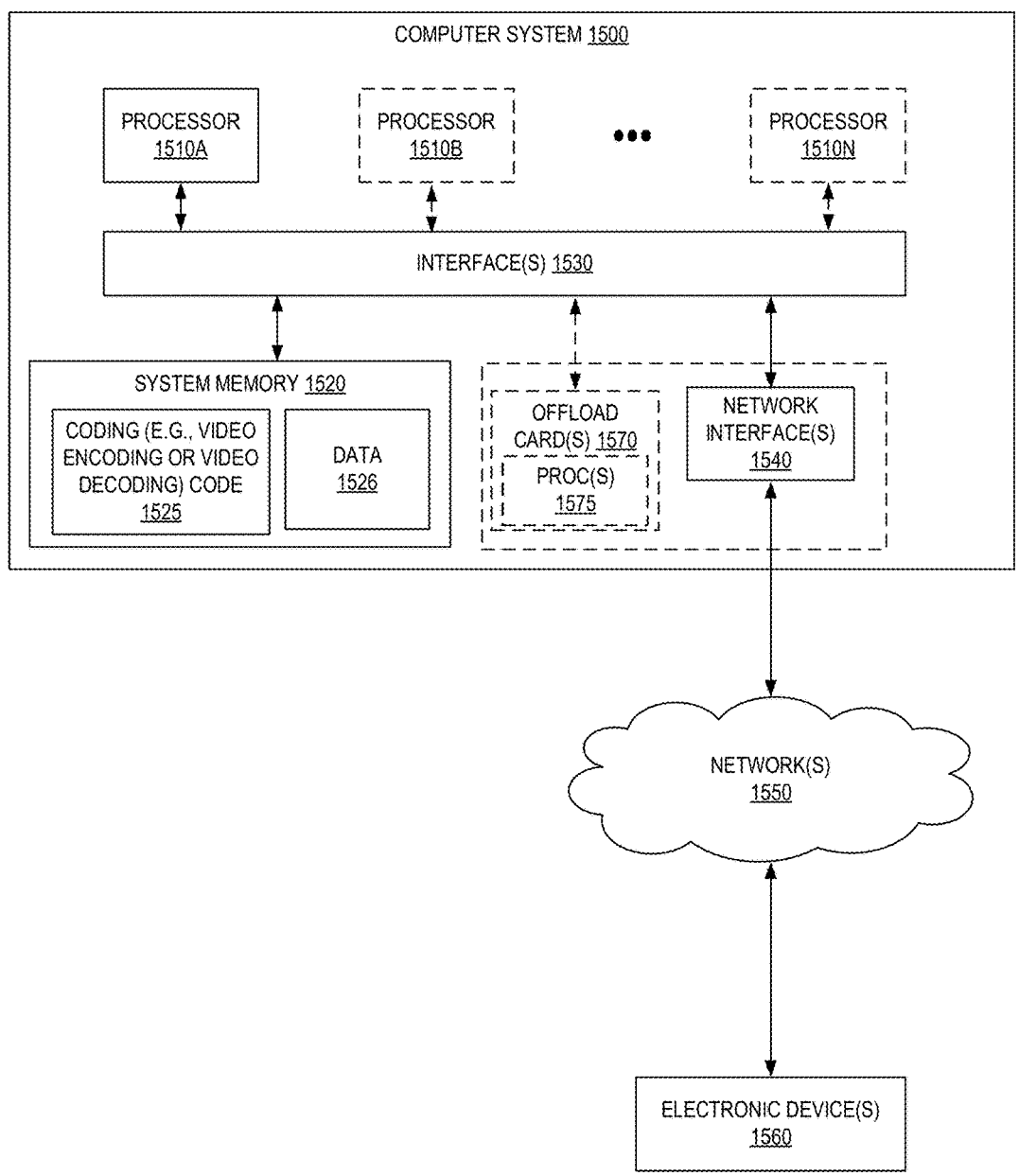
FIG. 15 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1500 illustrated in FIG. 15. In the illustrated example, computer system 1500 includes one or more processors 1510 coupled to a system memory 1520 via an input/output (I/O) interface 1530. Computer system 1500 further includes a network interface 1540 coupled to I/O interface 1530. While FIG. 15 shows computer system 1500 as a single computing device, in various examples a computer system 1500 may include one computing device or any number of computing devices configured to work together as a single computer system 1500.

In various examples, computer system 1500 may be a uniprocessor system including one processor 1510, or a multiprocessor system including several processors 1510 (e.g., two, four, eight, or another suitable number). Processors 1510 may be any suitable processors capable of executing instructions. For example, in various examples, processors 1510 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1510 may commonly, but not necessarily, implement the same ISA.

System memory 1520 may store instructions and data accessible by processor(s) 1510. In various examples, system memory 1520 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1520 as coding (e.g., video encoding or video decoding) code 1525 (e.g., executable to implement, in whole or in part, the operations discussed herein) and data 1526.

In one example, I/O interface 1530 may be configured to coordinate I/O traffic between processor 1510, system memory 1520, and any peripheral devices in the device, including network interface 1540 or other peripheral interfaces. In some examples, I/O interface 1530 may perform any necessary protocol, timing, or other data transformations to convert data signals from one component (e.g., system memory 1520) into a format suitable for use by another component (e.g., processor 1510). In some examples, I/O interface 1530 may include support for devices attached through various types of peripheral buses, such as a variant of the Peripheral Component Interconnect (PCI) bus standard or the Universal Serial Bus (USB) standard, for example. In some examples, the function of I/O interface 1530 may be split into two or more separate components, such as a north bridge and a south bridge, for example. Also, in some examples some or all of the functionality of I/O interface 1530, such as an interface to system memory 1520, may be incorporated directly into processor 1510.

Network interface 1540 may be configured to allow data to be exchanged between computer system 1500 and other devices 1560 attached to a network or networks 1550, such as other computer systems or devices as illustrated in FIG. 1, for example. In various examples, network interface 1540 may support communication via any suitable wired or wireless general data networks, such as types of Ethernet network, for example. Additionally, network interface 1540 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1500 includes one or more offload cards 1570 (including one or more processors 1575, and possibly including the one or more network interfaces 1540) that are connected using an I/O interface 1530 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1500 may act as a host electronic device (e.g., operating as part of a hardware virtualization service) that hosts compute instances, and the one or more offload cards 1570 execute a virtualization manager that can manage compute instances that execute on the host electronic device. As an example, in some examples the offload card(s) 1570 can perform compute instance management operations such as pausing and/or un-pausing compute instances, launching and/or terminating compute instances, performing memory transfer/copying operations, etc. These management operations may, in some examples, be performed by the offload card(s) 1570 in coordination with a hypervisor (e.g., upon a request from a hypervisor) that is executed by the other processors 1510A-1510N of the computer system 1500. However, in some examples the virtualization manager implemented by the offload card(s) 1570 can accommodate requests from other entities (e.g., from compute instances themselves), and may not coordinate with (or service) any separate hypervisor.

In some examples, system memory 1520 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1500 via I/O interface 1530. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 1500 as system memory 1520 or another type of memory. Further, a computer-accessible medium may include transmission media or signals such as electrical, electromagnetic, or digital signals, conveyed via a communication medium such as a network and/or a wireless link, such as may be implemented via network interface 1540.

Figure 16:
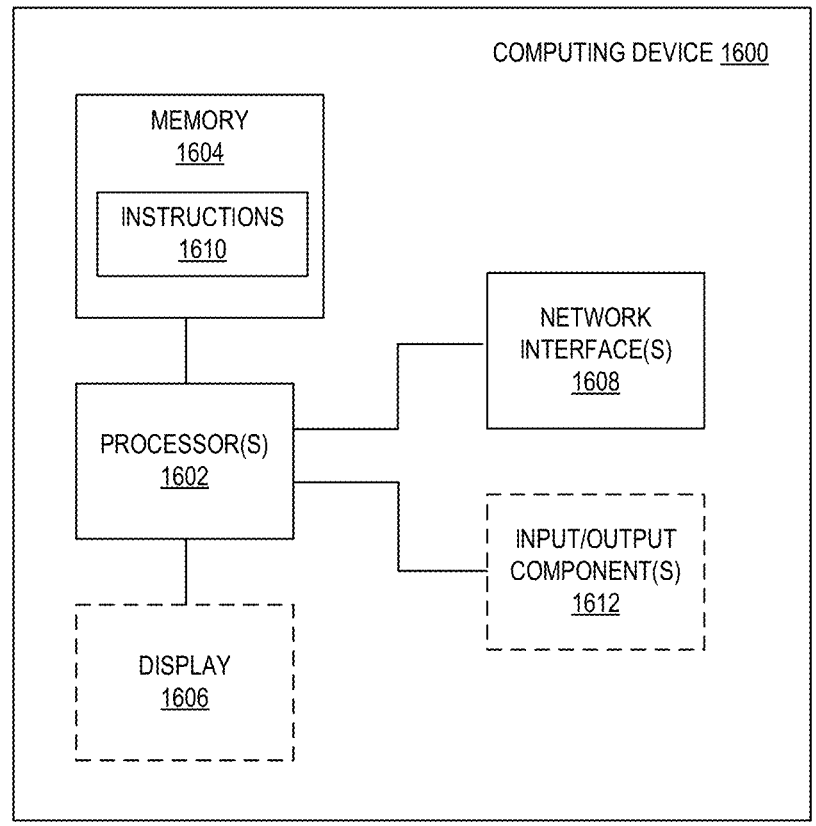
FIG. 16 illustrates a logical arrangement of a set of general components of an exemplary computing device that can be utilized in accordance with various examples.

FIG. 16 illustrates a logical arrangement of a set of general components of an example computing device 1600. Generally, a computing device 1600 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1602 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1604) to store code (for example, instructions 1610, e.g., which implement a content delivery service as disclosed herein), and a set of one or more wired or wireless network interfaces 1608 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1604) of a given electronic device typically stores code (e.g., instructions 1610) for execution on the set of one or more processors 1602 of that electronic device. One or more parts of various examples may be implemented using different combinations of software, firmware, and/or hardware.

A computing device 1600 can include some type of display element 1606, such as a touch screen or liquid crystal display (LCD), although many devices such as portable media players might convey information via other means, such as through audio speakers, and other types of devices such as server end stations may not have a display element 1606 at all. As discussed, some computing devices used in some examples include at least one input and/or output component(s) 1612 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 17:
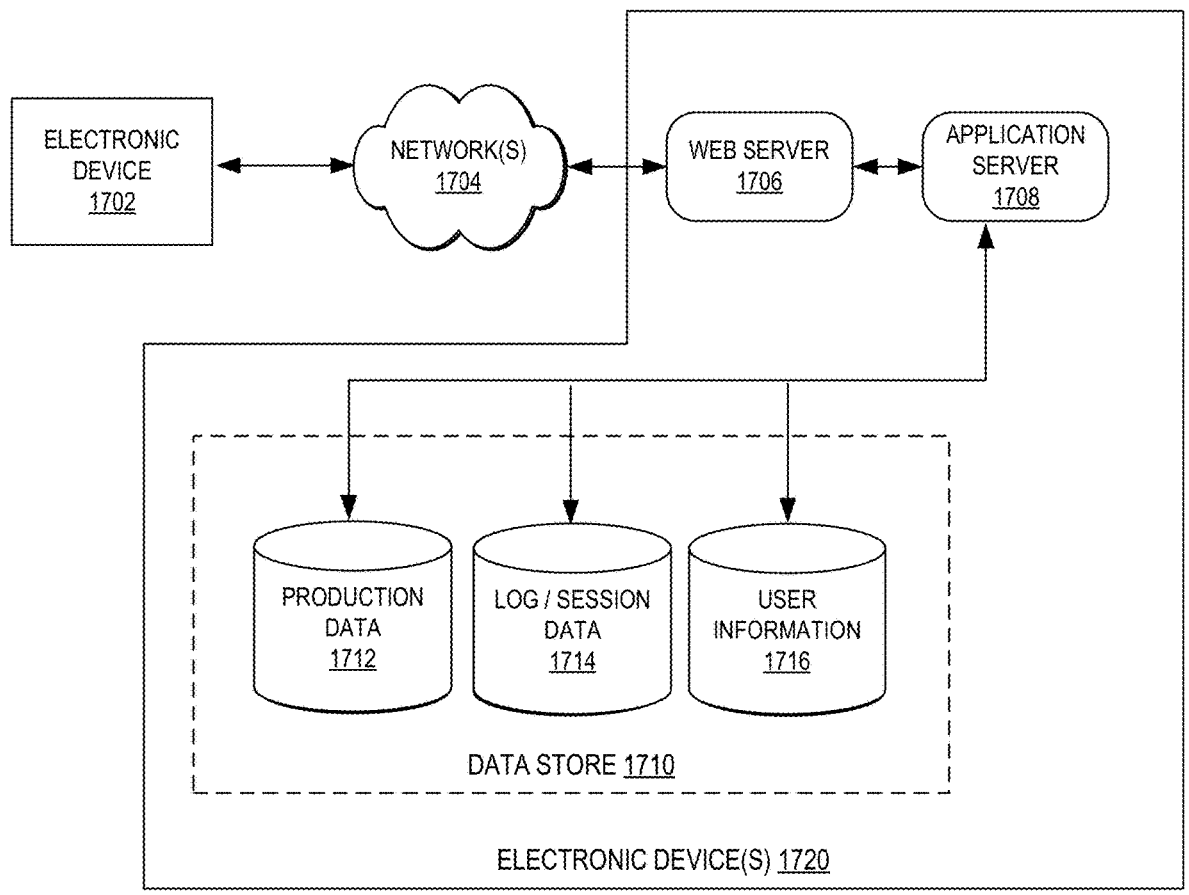
FIG. 17 illustrates an example of an environment for implementing aspects in accordance with various examples.

As discussed, different approaches can be implemented in various environments in accordance with the described examples. For example, FIG. 17 illustrates an example of an environment 1700 for implementing aspects in accordance with various examples. For example, in some examples messages are HyperText Transfer Protocol (HTTP) requests that are received by a web server (e.g., web server 1706), and the users, via electronic devices, may interact with the provider network via a web portal provided via the web server 1706 and application server 1708. As will be appreciated, although a web-based environment is used for purposes of explanation, different environments may be used, as appropriate, to implement various examples. The system includes an electronic client device 1702, which may also be referred to as a client device and can be any appropriate device operable to send and receive requests, messages, or information over an appropriate network 1704 and convey information back to a user of the device 1702. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1704 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1704 includes the Internet, as the environment includes a web server 1706 for receiving requests and serving content in response thereto, although for other networks an alternative device serving a similar purpose could be used, as would be apparent to one of ordinary skill in the art.

The illustrative environment includes at least one application server 1708 and a data store 1710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1708 can include any appropriate hardware and software for integrating with the data store 1710 as needed to execute aspects of one or more applications for the client device 1702 and handling a majority of the data access and business logic for an application. The application server 1708 provides access control services in cooperation with the data store 1710 and is able to generate content such as text, graphics, audio, video, etc., to be transferred to the client device 1702, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1702 and the application server 1708, can be handled by the web server 1706. It should be understood that the web server 1706 and application server 1708 are not required and are merely example components, as structured code discussed herein can be executed on any appropriate device or host machine as discussed elsewhere herein.

The data store 1710 can include several separate data tables, databases, or other data storage mechanisms and media for storing data relating to a particular aspect. For example, the data store illustrated includes mechanisms for storing production data 1712 and user information 1716, which can be used to serve content for the production side. The data store 1710 also is shown to include a mechanism for storing log or session data 1714. It should be understood that there can be many other aspects that may need to be stored in the data store, such as page image information and access rights information, which can be stored in any of the above listed mechanisms as appropriate or in additional mechanisms in the data store 1710. The data store 1710 is operable, through logic associated therewith, to receive instructions from the application server 1708 and obtain, update, or otherwise process data in response thereto. In one example, a user might submit a search request for a certain type of item. In this case, the data store 1710 might access the user information 1716 to verify the identity of the user and can access a production data 1712 to obtain information about items of that type. The information can then be returned to the user, such as in a listing of results on a web page that the user is able to view via a browser on the user device 1702. Information for a particular item of interest can be viewed in a dedicated page or window of the browser.

The web server 1706, application server 1708, and/or data store 1710 may be implemented by one or more electronic devices 1720, which can also be referred to as electronic server devices or server end stations, and may or may not be located in different geographic locations. Each of the one or more electronic devices 1720 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction of the environment 1700 in FIG. 17 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) may be used herein to illustrate optional operations that add additional features to some examples. However, such notation should not be taken to mean that these are the only options or optional operations, and/or that blocks with solid borders are not optional in certain examples.

Reference numerals with suffix letters (e.g., 1418A-1418N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," "certain examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a video at a content delivery service;
   encoding, by the content delivery service, the video into an encoded video;
   generating, by the content delivery service, at least one open bitstream unit from the encoded video according to a video coding format that does not utilize a show existing frame syntax element set to one to indicate a frame in a reference picture buffer of a decoder is to be displayed; and
   transmitting the at least one open bitstream unit from the content delivery service to the decoder.

2. The computer-implemented method of claim 1, wherein the generating, by the content delivery service, the at least one open bitstream unit from the encoded bitstream is according to the video coding format that utilizes a display order hint to indicate the frame in the reference picture buffer of the decoder is to be displayed.

3. The computer-implemented method of claim 2, wherein the generating, by the content delivery service, the at least one open bitstream unit from the encoded bitstream is according to the video coding format that further utilizes a showable frame syntax element to indicate the frame in the reference picture buffer of the decoder is to be displayed.

4. A computer-implemented method comprising:
   receiving a video at a content delivery service;
   encoding, by the content delivery service, the video into an encoded video;
   generating, by the content delivery service, at least one open bitstream unit from the encoded video without including a show existing frame syntax element to indicate a frame in a reference picture buffer of a decoder is to be displayed; and
   transmitting the at least one open bitstream unit from the content delivery service to the decoder.

5. The computer-implemented method of claim 4, wherein the generating, by the content delivery service, the at least one open bitstream unit from the encoded bitstream utilizes a display order hint to indicate the frame in the reference picture buffer of the decoder is to be displayed.

6. The computer-implemented method of claim 5, wherein the generating, by the content delivery service, the at least one open bitstream unit from the encoded bitstream further utilizes a showable frame syntax element to indicate the frame in the reference picture buffer of the decoder is to be displayed.

7. The computer-implemented method of claim 5, wherein the display order hint is a value within a range that is less than a total number of frames in the video.

8. The computer-implemented method of claim 4, wherein the generating, by the content delivery service, the at least one open bitstream unit from the encoded video is without including a showable frame syntax element.

9. The computer-implemented method of claim 8, wherein the generating, by the content delivery service, the at least one open bitstream unit from the encoded video is without including a show frame syntax element.

10. The computer-implemented method of claim 4, wherein the generating, by the content delivery service, the at least one open bitstream unit from the encoded video is without including a show frame syntax element.

11. The computer-implemented method of claim 4, wherein the generating, by the content delivery service, the at least one open bitstream unit from the encoded bitstream utilizes a picture order count to indicate the frame in the reference picture buffer of the decoder is to be displayed.

12. The computer-implemented method of claim 4, wherein the generating, by the content delivery service, the at least one open bitstream unit from the encoded bitstream utilizes a frame identifier to indicate the frame in the reference picture buffer of the decoder is to be displayed.

13. The computer-implemented method of claim 4, wherein the generating, by the content delivery service, the at least one open bitstream unit from the encoded bitstream utilizes a time stamp to indicate the frame in the reference picture buffer of the decoder is to be displayed.

14. The computer-implemented method of claim 13, wherein the time stamp is a frame presentation time syntax element.

15. An apparatus comprising:
   a coupling to a display; and
   a video decoder to:
      receive at least one open bitstream unit, of an encoded video, that does not include a show existing frame syntax element that indicates a decoded frame in a reference picture buffer of the video decoder is to be displayed,
      generate the decoded frame based on the at least one open bitstream unit of the encoded video,
      store the decoded frame in the reference picture buffer of the video decoder,
      determine, based on other information available to the video decoder, that the decoded frame in the reference picture buffer of the video decoder is to be displayed, and
      transmit the decoded frame from the reference picture buffer of the video decoder to the coupling for displaying on the display.

16. The apparatus of claim 15, wherein the other information comprises a display order hint in the at least one open bitstream unit.

17. The apparatus of claim 16, wherein the display order hint is a value within a range that is less than a total number of frames in the video.

18. The apparatus of claim 15, wherein the at least one open bitstream unit does not include a showable frame syntax element.

19. The apparatus of claim 15, wherein the at least one open bitstream unit does not include a show frame syntax element.

20. The apparatus of claim 15, wherein the other information comprises a frame presentation time syntax element.

* * * * *